United States Patent
Lee et al.

(10) Patent No.: US 12,523,383 B2
(45) Date of Patent: Jan. 13, 2026

(54) VENTILATION SYSTEM WITH CLEANING MODE AND METHOD FOR CONTROLLING THE SAME

(71) Applicant: SAMSUNG ELECTRONICS CO., LTD., Suwon-si (KR)

(72) Inventors: Donggyu Lee, Suwon-si (KR); Kyunghoon Kim, Suwon-si (KR); Sunggoo Kim, Suwon-si (KR); Seonuk Na, Suwon-si (KR); Hyeongjoon Seo, Suwon-si (KR); Jaehyoung Sim, Suwon-si (KR); Eomji Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 18/367,855

(22) Filed: Sep. 13, 2023

(65) Prior Publication Data

US 2024/0167710 A1    May 23, 2024

Related U.S. Application Data

(63) Continuation of application No. PCT/KR2023/013011, filed on Aug. 31, 2023.

(30) Foreign Application Priority Data

Nov. 18, 2022  (KR) ........................ 10-2022-0155765

(51) Int. Cl.
  *F24F 11/42*        (2018.01)
  *F24F 11/65*        (2018.01)
  (Continued)

(52) U.S. Cl.
  CPC .............. *F24F 11/42* (2018.01); *F24F 11/65* (2018.01); *F24F 11/77* (2018.01); *F24F 12/006* (2013.01);
  (Continued)

(58) Field of Classification Search
  CPC ........ F24F 12/00; F24F 12/001; F24F 12/006; F24F 2012/007; F24F 2012/008
  See application file for complete search history.

(56) References Cited

U.S. PATENT DOCUMENTS

2018/0259216 A1*  9/2018  Zhang ....................... F24F 11/65
2022/0316732 A1   10/2022  Son et al.

FOREIGN PATENT DOCUMENTS

| JP | 2008-138913 | 6/2008 |
|---|---|---|
| JP | 2011-127894 | 6/2011 |

(Continued)

OTHER PUBLICATIONS

KR 10-2357605 (English translation) (Year: 2022).*

(Continued)

*Primary Examiner* — Jonathan Bradford
(74) *Attorney, Agent, or Firm* — STAAS & HALSEY LLP

(57) ABSTRACT

A ventilation system including a ventilator; and an outdoor unit, wherein the ventilator includes a housing including a first intake, a second intake, a first outlet and a second outlet, a plurality of dampers to change flow paths of air flowing through the housing, first and second air blowers, a heat exchanger in the housing, and a processor to control the dampers and first and second air blowers to form a first flow path in which outside air flows through the heat exchanger, or form a second flow path in which room air flows through the heat exchanger, to thereby form a flow path in the ventilator, while air flows through the flow path, control the outdoor unit to form frost on the heat exchanger, and control the outdoor unit to stop operating based on a preset frosting termination condition so that the frost melts to clean the heat exchanger.

15 Claims, 14 Drawing Sheets

(51) Int. Cl.
  *F24F 11/77* (2018.01)
  *F24F 12/00* (2006.01)
  *F24F 13/10* (2006.01)
  *F24F 110/10* (2018.01)
  *F24F 110/20* (2018.01)
  *F24F 110/52* (2018.01)

(52) U.S. Cl.
  CPC ........... *F24F 13/10* (2013.01); *F24F 2110/10* (2018.01); *F24F 2110/20* (2018.01); *F24F 2110/52* (2018.01); *F24F 2221/22* (2013.01); *Y02B 30/56* (2013.01)

(56) References Cited

FOREIGN PATENT DOCUMENTS

| | | |
|---|---|---|
| JP | 6353998 | 7/2018 |
| JP | 2019-39669 | 3/2019 |
| JP | 6641066 | 2/2020 |
| JP | 6975850 | 12/2021 |
| JP | 2022-39664 | 3/2022 |
| JP | 2022-41712 | 3/2022 |
| KR | 10-1527609 | 6/2015 |
| KR | 10-2249491 | 5/2021 |
| KR | 10-2021-0087408 | 7/2021 |
| KR | 10-2021-0113151 | 9/2021 |
| KR | 10-2021-0135211 | 11/2021 |
| KR | 10-2357605 | 2/2022 |
| KR | 10-2022-0068321 | 5/2022 |
| WO | WO 2018/198397 A1 | 11/2018 |

OTHER PUBLICATIONS

KR 2019-0117897 (English translation) (Year: 2019).*
KR 10-2019-0050211 (Year: 2012).*
International Search Report dated Dec. 20, 2023 for International Application No. PCT/KR2023/013011.
Written Opinion of the International Searching Authority dated Dec. 20, 2023 for International Application No. PCT/KR2023/013011.

* cited by examiner

VENTILATION SYSTEM WITH CLEANING MODE AND METHOD FOR CONTROLLING THE SAME

CROSS-REFERENCE TO RELATED APPLICATIONS

This application is a continuation application, under 35 U.S.C. § 111 (a), of International Application No. PCT/KR2023/013011, filed on Aug. 31, 2023, which claims priority under 35 U.S.C. § 119 to Korean Patent Application No. 10-2022-0155765, filed on Nov. 18, 2022, in the Korean Intellectual Property Office, the disclosures of which are incorporated by reference herein in their entireties.

BACKGROUND

1. Field

The disclosure relates to a ventilation system for providing pleasant air into indoor space.

2. Description of Related Art

A ventilation system is an apparatus for ventilating indoor space by supplying outside air into the indoor space or exchanging room air with outside air. The traditional ventilator has no choice but to control room temperature and humidity by only total heat exchange between outside air and room air, which takes place while the air is passing a total heat exchanger. This leads to incomplete dehumidification of the outside air supplied indoors and makes it difficult to maintain the room temperature and humidity in a pleasant state.

Furthermore, as the use of the ventilator increases these days when quality, hygiene and cleanliness of room air are highlighted, there is a growing interest in the issues of contamination of the inside of the ventilator. Accordingly, a method of cleaning inside of the ventilator is required.

SUMMARY

Aspects of embodiments of the disclosure will be set forth in part in the description which follows and, in part, will be apparent from the description, or may be learned by practice of the presented embodiments.

According to an embodiment of the disclosure, a ventilation system includes a ventilator and an outdoor unit. The ventilator includes a housing including a first intake, a second intake, a first outlet and a second outlet, a plurality of dampers configured to change flow paths of air flowing through the housing, a first air blower configured to blow the air to the first outlet, a second air blower configured to blow the air to the second outlet, a total heat exchanger in the housing, a heat exchanger in the housing, and a processor configured to, in response to entering a heat exchanger cleaning mode, control the plurality of dampers, the first air blower, and the second air blower to form a first flow path in which outside air is drawn in through the first intake, then flows through the total heat exchanger, then flows through the heat exchanger, and is then discharged through the first outlet, or form a second flow path in which room air is drawn in through the second intake, then flows through the total heat exchanger, then flows through the heat exchanger, and is then discharged through the first outlet, to thereby form a flow path in the ventilator, while air flows through the flow path formed in the ventilator, control the outdoor unit to operate to form frost on the heat exchanger, and control the outdoor unit to stop operating based on a preset frosting termination condition so that the frost melts to clean the heat exchanger.

According to an embodiment of the disclosure, the plurality of dampers may include a first damper configured to open and close the first intake, and a second damper configured to open and close a connection flow path formed between the first intake and the second intake. The processor may be configured to control the first damper to open the first intake and the second damper to close the connection flow path, and operate the first air blower to form the first flow path, or control the first damper to close the first intake and the second damper to open the connection flow path, and operate the first air blower to form the second flow path.

According to an embodiment of the disclosure, the ventilator may include a temperature sensor configured to detect a temperature of the outside air flowing through the first flow path and detect a temperature of the room air flowing through the second flow path, and a humidity sensor configured to detect a relative humidity of the outside air flowing through the first flow path and detect a relative humidity of the room air flowing through the second flow path.

According to an embodiment of the disclosure, the processor may be configured to control the plurality of dampers to alternately form the first flow path and the second flow path for a preset period of time each, in response to entering the heat exchanger cleaning mode, calculate a first absolute humidity based on the detected temperature and the detected relative humidity of the outside air flowing through the first flow path, calculate a second absolute humidity based on the detected temperature and the detected relative humidity of the room air flowing through the second flow path, and select one of the first flow path and the second flow path to form the flow path in the ventilator based on a comparison between the first absolute humidity and the second absolute humidity.

According to an embodiment of the disclosure, the processor may be configured to select the first flow path based on the first absolute humidity being higher than the second absolute humidity, or select the second flow path based on the first absolute humidity being lower than the second absolute humidity.

According to an embodiment of the disclosure, the ventilator may include a heat exchanger temperature sensor configured to detect a temperature of the heat exchanger. The preset frosting termination condition may include an operation time of the outdoor unit reaching a preset limit time or the temperature of the heat exchanger reaching a target temperature.

According to an embodiment of the disclosure, the processor may be configured to determine the target temperature based on a preset correlation function having variables of the detected temperature and the detected relative humidity of the outside air flowing through the first path or having variables of the detected temperature and the detected relative humidity of the room air flowing through the second flow path.

According to an embodiment of the disclosure, the processor may be configured to determine a rotation speed of a compressor included in the outdoor unit and a rotation speed of the first air blower based on the detected relative humidity of the outside air flowing through the first flow path through or the detected relative humidity of the room air flowing through the second flow path.

According to an embodiment of the disclosure, the processor may be configured to reduce the rotation speed of the compressor and the rotation speed of the first air blower based on the relative humidity of the outside air flowing through the first flow path or the relative humidity of the room air flowing through the second flow path being higher than a preset reference humidity range, or increase the rotation speed of the compressor and the rotation speed of the first air blower based on the relative humidity of the outside air flowing through the first flow path or the relative humidity of the room air flowing through the second flow path being lower than the preset reference humidity range.

According to an embodiment of the disclosure, the ventilation system may further include a display configured to display information regarding an operation of the ventilation system. The processor may be configured to control the display to display flow path information regarding a selection of one of the first flow path and the second flow path.

According to an embodiment of the disclosure, the ventilation system may further include a display configured to display information regarding an operation of the ventilation system. The processor may be configured to control the display to display an expected time required until cleaning of the heat exchanger is completed after the outdoor unit is stopped based on the preset frosting termination condition.

According to an embodiment of the disclosure, a ventilation system includes a ventilator and an outdoor unit. The ventilator includes a housing including a first intake, a second intake, a first outlet and a second outlet, a plurality of dampers configured to change flow paths of air flowing through the housing, a first air blower configured to blow the air to the first outlet, a second air blower configured to blow the air to the second outlet, a total heat exchanger in the housing, a heat exchanger in the housing, a heat exchanger temperature sensor configured to detect temperature of the heat exchanger, and a processor configured to, in response to entering a heat exchanger cleaning mode, control the plurality of dampers, the first air blower, and the second air blower to force the air to flow into the heat exchanger, while the air flows into the heat exchanger, control the outdoor unit to operate to form frost on the heat exchanger, and control the outdoor unit to stop operating based on an operation time of the outdoor unit reaching a preset limit time or a detected temperature of the heat exchanger reaching a target temperature.

According to an embodiment of the disclosure, the ventilator may include a temperature sensor configured to detect temperature of the air flowing into the heat exchanger, and a humidity sensor configured to detect a relative humidity of the air flowing into the heat exchanger. The processor may be configured to determine the target temperature based on a preset correlation function having the temperature of the air flowing into the heat exchanger and the relative humidity of the air flowing into the heat exchanger as variables.

According to an embodiment of the disclosure, the ventilator may include a humidity sensor configured to detect a relative humidity of the air flowing into the heat exchanger. The processor may be configured to determine a rotation speed of a compressor included in the outdoor unit and a rotation speed of the first air blower based on the detected relative humidity of the air flowing into the heat exchanger.

According to an embodiment of the disclosure, the processor may be configured to reduce the rotation speed of the compressor and the rotation speed of the first air blower based on the relative humidity of the air flowing into the heat exchanger being higher than a preset reference humidity range, or increase the rotation speed of the compressor and the rotation speed of the first air blower based on the relative humidity of the air flowing into the heat exchanger being lower than the preset reference humidity range.

BRIEF DESCRIPTION OF THE DRAWINGS

These and/or other embodiments of the disclosure will become apparent and more readily appreciated from the following description of embodiments, taken in conjunction with the accompanying drawings of which.

DETAILED DESCRIPTION

Figure 1:
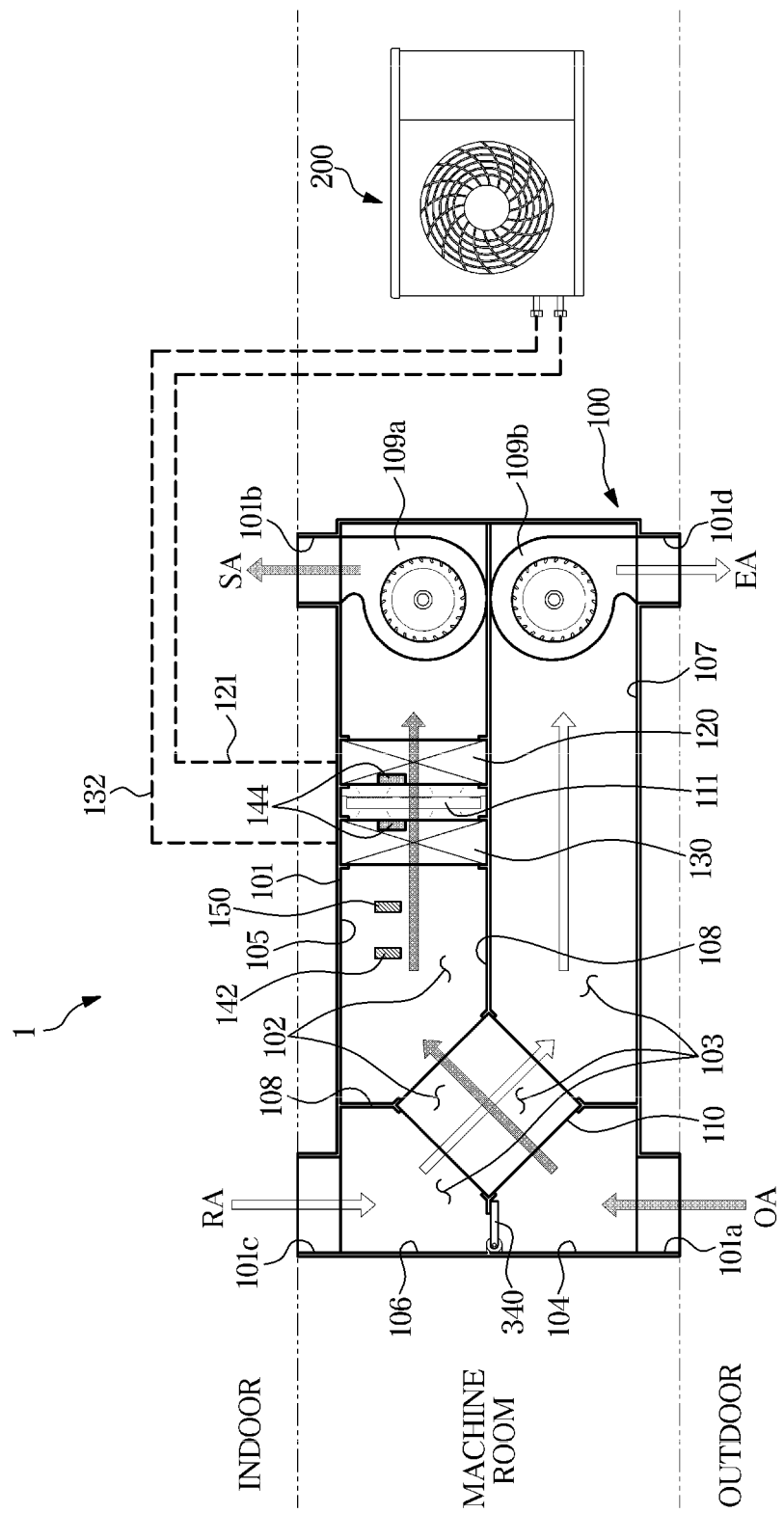
FIG. 1 illustrates a ventilation system including a ventilator, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components. For the sake of clarity, the elements of the drawings are drawn with exaggerated forms and sizes.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It is to be understood that the singular forms "a," "'an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "— and/or —," or the like.

Furthermore, the terms, such as "— part", "— block", "— member", "— module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may also be practiced otherwise.

Embodiments of the disclosure may provide a ventilation system capable of cleaning a heat exchanger arranged in a ventilator.

Embodiments of the disclosure may provide a ventilation system that may clean a heat exchanger by forming frost on a heat exchanger inside a ventilator and then melting the frost.

Embodiments of the disclosure may provide a ventilation system that may effectively clean the heat exchanger by selectively changing the flow path of air flowing into the heat exchanger.

Embodiments of the disclosure may provide a ventilation system that may also prevent poor cleaning of the heat exchanger and prevent unnecessary energy consumption by appropriately setting a condition to terminate the cleaning of the heat exchanger.

Embodiments of the disclosure will now be described with reference to the accompanying drawings.

Figure 2:
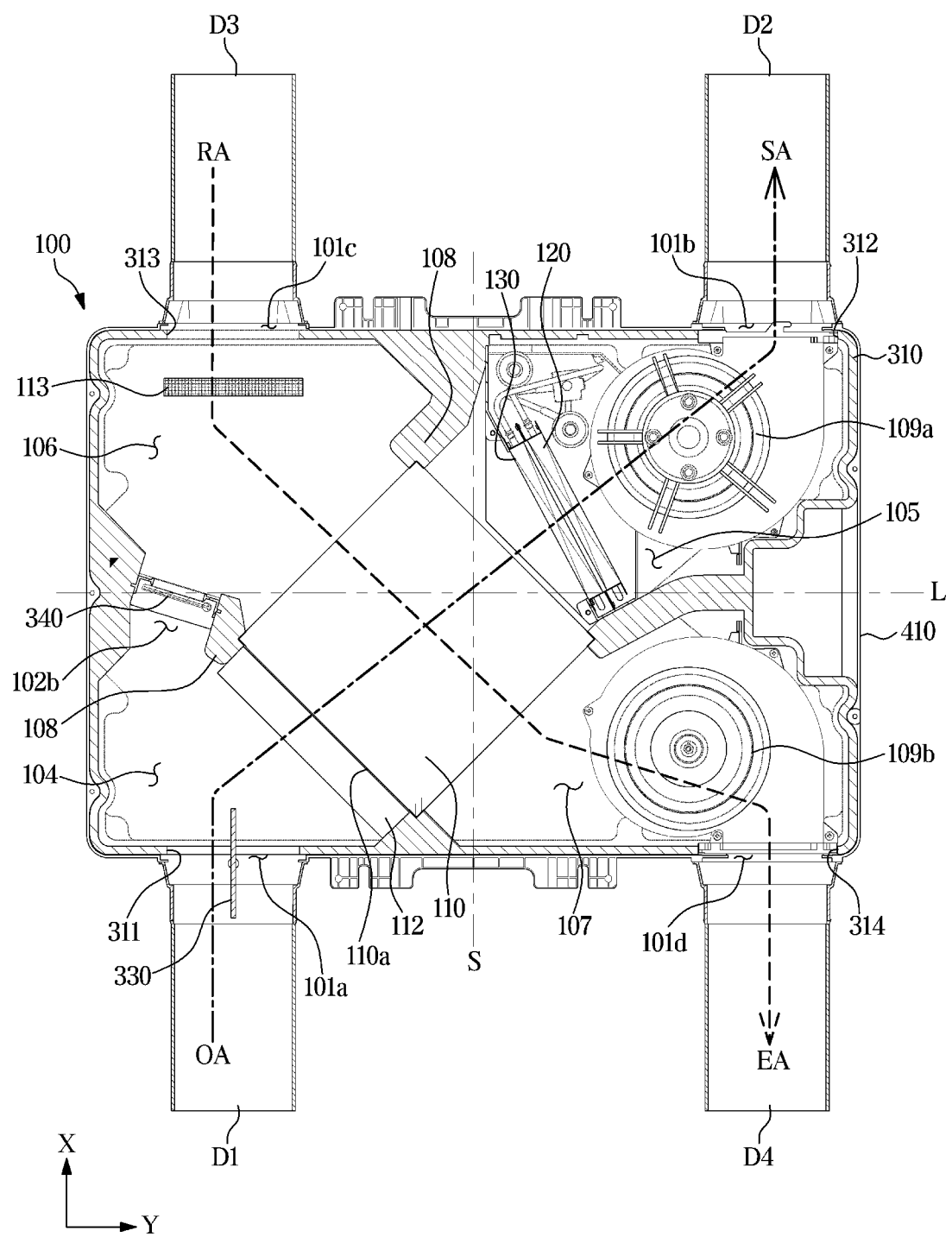
FIG. 2 is a plan view of an interior of a ventilator according to an embodiment of the disclosure viewed from above, illustrating an example of an air flow path formed inside the ventilator.

FIG. 1 illustrates a ventilation system including a ventilator, according to an embodiment. FIG. 2 is a plan view of an interior of a ventilator viewed from above, illustrating an example of an air flow path formed inside the ventilator.

Referring to FIGS. 1 and 2, a ventilation system 1 may include a ventilator 100 connected to indoor space and outdoor space. The ventilation system 1 may also include an outdoor unit 200 for supplying a refrigerant to the ventilator 100. The ventilator 100 and the outdoor unit 200 may be installed in a machine room (e.g., a utility room in the house) differentiated from the outdoor space and the indoor space. There are no limitations on the place where the ventilator 100 and the outdoor unit 200 are installed.

The ventilator 100 may include a housing 101 that forms the external appearance. For example, the housing 101 may be shaped like a hexahedron. The housing 101 may include an intake flow path 102 that draws in and guides outside air OA into the indoor space, and a discharge flow path 103 that guides room air RA to the outdoor space. The intake flow path 102 and the discharge flow path 103 may be separated by a plurality of partitions 108.

The housing 101 may include a first intake 101a connected to the outdoor space and formed to draw the outside air OA into the housing 101, a first outlet 101b connected to the indoor space and formed to discharge the outside air OA drawn into the housing 101 to the indoor space, and a first intake room 104 and a second intake room 105, which form the intake flow path 102. The intake flow path 102 may connect the first intake 101a to the first outlet 101b.

The housing 101 may include a second intake 101c connected to the indoor space and formed to draw the room air RA into the housing 101, a second outlet 101d connected to the outdoor space and formed to discharge the room air RA drawn into the housing 101 to the outdoor space, and a first discharge room 106 and a second discharge room 107, which form the discharge flow path 103. The discharge flow path 103 may connect the second intake 101c to the second outlet 101d.

The ventilator 100 may include a first duct D1 connected to the first intake 101a of the housing 101 and extending to the outdoor space, a second duct D2 connected to the first outlet 101b and extending to the indoor space, a third duct D3 connected to the second intake 101c and extending to the indoor space, and a fourth duct D4 connected to the second outlet 101d and extending to the outdoor space.

The ventilator 100 may include a first air blower 109a connected to the first outlet 101b in the second intake room 105, and a second air blower 109b connected to the second outlet 101d in the second discharge room 107. The first air blower 109a may create wind power required to discharge air through the first outlet 101b. The second air blower 109b may create wind power required to discharge air through the second outlet 101d. Specifically, when the first air blower 109a operates, the air in the housing 101 is discharged into the indoor space through the first outlet 101b. When the second air blower 109b operates, the air in the housing 101 is discharged to the outdoor space through the second outlet 101d.

The ventilator 100 may include a total heat exchanger 110 arranged to exchange heat between the outside air OA and the room air RA. When the ventilation system 1 operates in a ventilation mode, the air flowing in the discharge flow path 103 and the air flowing in the intake flow path 102 may exchange heat with each other in the total heat exchanger 110. During the ventilating operation of the ventilation system 1, the air discharged into the indoor space through the first outlet 101b may be referred to as supplied air SA, and the air discharged to the outdoor space through the second outlet 101d may be referred to as exhaust air EA.

The total heat exchanger 110 may be formed of a paper material coated with lithium chloride and may also be referred to as a total heat exchanging element. The total heat exchanger 110 may be implemented as a plate-type total heat exchanger or a rotary-type total heat exchanger. The total heat exchanger 110 may be placed at a point where the intake flow path 102 and the discharge flow path 103 cross. In other words, the total heat exchanger 110 is arranged in the intake flow path 102 and at the same time, in the discharge flow path 103.

The total heat exchanger 110 may connect the first intake room 104 to the second intake room 105. The total heat exchanger 110 may connect the first discharge room 106 to the second discharge room 107. During the ventilating operation of the ventilation system 1, the outside air OA flowing through the intake flow path 102 and the room air RA flowing through the discharge flow path 103 exchange heat in the total heat exchanger 110 without contact.

The ventilator 100 may include a filter 112 for capturing foreign materials contained in the outside air OA. The filter 112 may be arranged to be adjacent to the total heat exchanger 110. The total heat exchanger 110 may include an intake air inflow end 110a, and the filter 112 may be arranged to face the intake air inflow end 110a of the total heat exchanger 110.

It may be desirable for the filter 112 to be arranged to closely face the intake air inflow end 110a. Accordingly, the foreign materials contained in the outside air OA flowing in through the first intake 101a may be filtered out and prevent contamination of the total heat exchanger 110.

For example, the filter 112 may be a high efficiency particulate air (HEPA) filter. The HEPA filter may be comprised of glass fiber. The filter 112 may be provided as a photocatalytic filter that uses a photocatalyst to induces a chemical action of air. Specifically, the filter 112 may include a photocatalyst and induce a chemical reaction to light energy of the photocatalyst to capture various pathogens and bacteria present in the air. Acceleration of the chemical action may lead to decomposition, removal or capture of odor particles in the air. It is not, however, limited thereto, and many different types of filters capable of capturing foreign materials may be provided for the filter 112.

The traditional ventilator includes only a total heat exchanger for performing heat exchange between the outside air OA and the room air RA. The traditional ventilator is not connected to the outdoor unit. In other words, the traditional ventilator does not include an extra heat exchanger that receives the refrigerant from the outdoor unit. The traditional ventilator is only able to supply outside air into the indoor space and discharge room air to the outdoor space, and is unable to perform an extra dehumidifying function.

On the contrary, the ventilator 100 as disclosed herein includes heat exchangers 120 and 130 provided to regulate humidity and temperature of the air flowing in the intake flow path 102. The heat exchangers 120 and 130 may be referred to as a dehumidification module. The heat exchangers 120 and 130 may remove moisture contained in the air passing through the heat exchangers 120 and 130. As the moisture contained in the air is removed while passing through the heat exchangers 120 and 130, dry air may be supplied into the indoor space. The intake flow path 102 may also be referred to as a first flow path.

The heat exchangers 120 and 130 may include the first heat exchanger 120 and the second heat exchanger 130. The heat exchangers 120 and 130 may be arranged in the intake flow path 102. The heat exchangers 120 and 130 may be arranged in the second intake room 105. The first heat exchanger 120 and the second heat exchanger 130 may be placed farther downstream in the intake flow path 102 than the total heat exchanger 110 is. The second heat exchanger 130 may be placed on a farther upstream side of the intake flow path 102 than the first heat exchanger 120 is. In other words, the first heat exchanger 120 may be placed on a farther downstream side of the intake flow path 102 than the second heat exchanger 130 is.

There are no limitations on the number of heat exchangers to be arranged in the ventilator 100. That is, the ventilator 100 may include at least one heat exchanger.

During the ventilating operation of the ventilation system 1, the outside air OA drawn in through the first intake 101a passes the first intake room 104, the total heat exchanger 110, the second heat exchanger 130, and the first heat exchanger 120 in sequence and is then discharged to the indoor space through the first outlet 101b. The room air RA drawn in through the second intake 101c passes the first discharge room 106 and the total heat exchanger 110 and is then discharged to the outdoor space through the second outlet 101d.

The air flowing in the intake flow path 102 from the first intake 101a to the first outlet 101b may be dehumidified by the second heat exchanger 130. Furthermore, the air that has passed the second heat exchanger 130 may be heated or cooled by the first heat exchanger 120.

The ventilator 100 may include a first sterilizer 111 for sterilizing the first heat exchanger 120 and the second heat exchanger 130. The first sterilizer 111 may be arranged between the first heat exchanger 120 and the second heat exchanger 130. The first sterilizer 111 may sterilize both the first heat exchanger 120 and the second heat exchanger 130 arranged on either side. The first sterilizer 111 may include an ultraviolet light source for irradiating an ultraviolet ray. For example, the first sterilizer 111 may include a UV light emitting diode (LED).

Furthermore, the ventilator 100 may include a second sterilizer 113 for sterilizing room air RA drawn in through the second intake 101c. The second sterilizer 113 may be placed in the first discharge room 106. For example, the second sterilizer 113 may include at least one of a heater, an infrared lamp, or a UV LED.

The ventilator 100 may include various temperature sensors. For example, the ventilator 100 may include a temperature sensor 142 for detecting temperature of air flowing into the heat exchangers 120 and 130, and a temperature sensor 144 for detecting temperature of the heat exchangers 120 and 130.

The temperature sensor 142 may be placed farther upstream in the intake flow path 102 than the heat exchangers 120 and 130. The temperature sensor 142 may also be referred to as a first temperature sensor. For example, the temperature sensor 142 may be located between the total heat exchanger 110 and the second heat exchanger 130.

Figure 3:
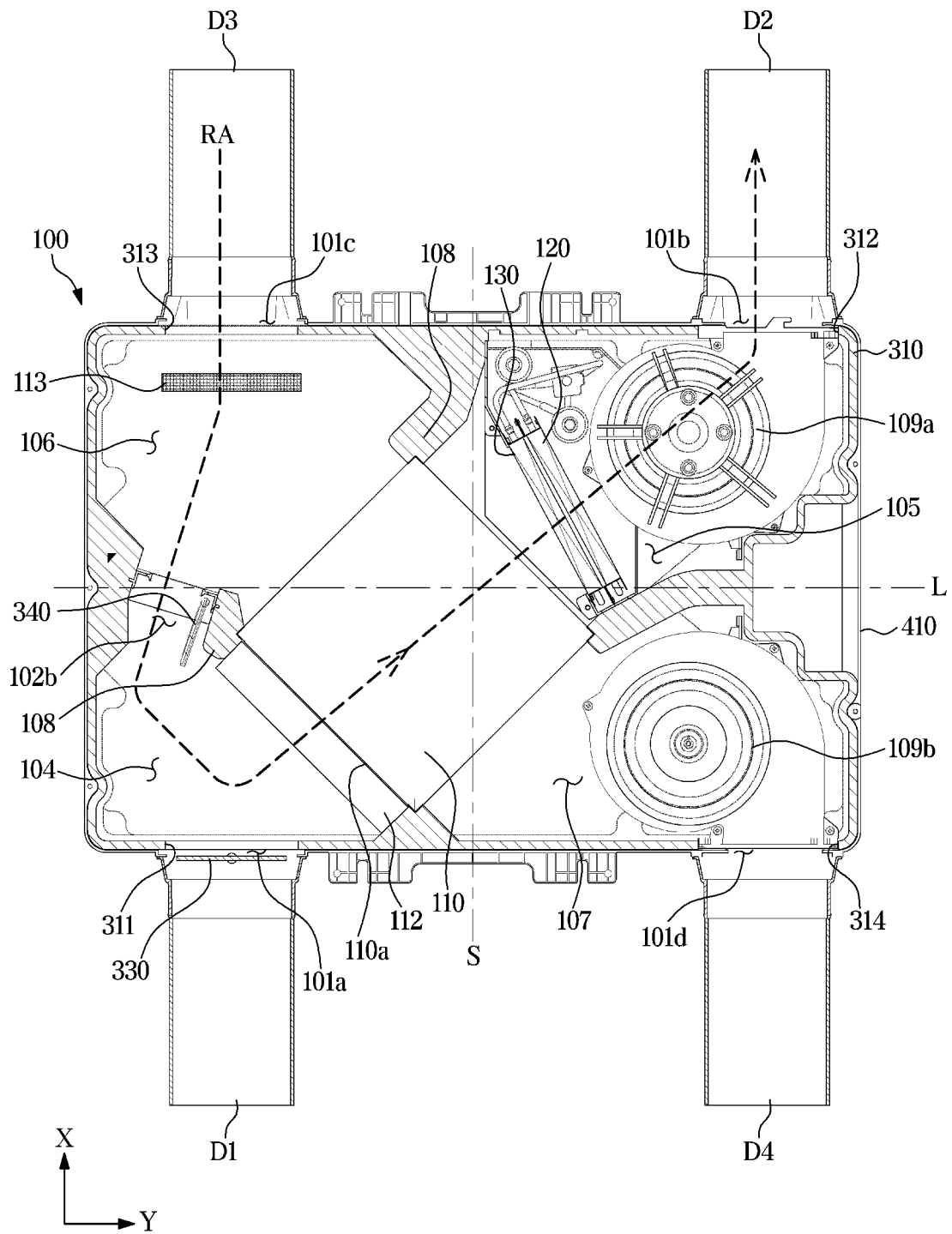
FIG. 3 illustrates another example of an air flow path formed inside a ventilator according to an embodiment of the disclosure.

As shown in FIG. 1 and FIG. 2, the temperature sensor 142 may detect first temperature of the outside air OA flowing into the heat exchangers 120 and 130 through the first flow path, which is the intake flow path 102. Furthermore, as shown in FIG. 3, as a plurality of dampers 330 and 340 operate, a second flow path that leads the room air RA drawn in in through the second intake 101c to the heat exchangers 120 and 130 may be formed. In this case, the temperature sensor 142 may detect second temperature of the room air RA flowing into the heat exchangers 120 and 130 through the second flow path.

The heat exchanger temperature sensor 144 may be arranged on the surface of the heat exchangers 120 and 130. The heat exchanger temperature sensor 144 may be provided to measure both temperatures of the first heat exchanger 120 and the second heat exchanger 130, or may be provided separately for each of the first heat exchanger 120 and the second heat exchanger 130. The heat exchanger temperature sensor 144 may also be referred to as a second temperature sensor.

Furthermore, although not shown, the ventilator 100 may further include at least one of a temperature sensor arranged at each of the first intake 101a and the second intake 101c and a discharge temperature sensor for measuring a discharge temperature, which is temperature of supplied air SA discharged indoors after passing through the heat exchangers 120 and 130. The discharge temperature sensor may be placed farther downstream in the intake flow path 102 than the first and second heat exchangers 120 and 130. The discharge temperature sensor may measure temperature of the supplied air SA discharged indoors through the first outlet 101b.

The ventilator 100 may include a humidity sensor 150 for measuring relative humidity of the air flowing into the heat exchangers 120 and 130. The humidity sensor 150 may be placed farther upstream in the intake flow path 102 than the heat exchangers 120 and 130. For example, the humidity sensor 150 may be located between the total heat exchanger 110 and the second heat exchanger 130.

As shown in FIG. 2, the humidity sensor 150 may detect first relative humidity of the outside air OA flowing into the heat exchangers 120 and 130 through the first flow path, which is the intake flow path 102. Furthermore, as shown in FIG. 3, when the second flow path is formed, the humidity sensor 150 may detect second relative humidity of the room air RA flowing into the heat exchangers 120 and 130 through the second flow path.

Referring to FIGS. 2 and 3, the housing 101 may include a connection flow path 102b that connects the first intake room 104 to the first discharge room 106. The connection flow path 102b may be arranged between the first intake room 104 and the first discharge room 106 and arranged on the partition 108 that separates the first intake room 104 and the first discharge room 106. The connection flow path 102b may be formed by cutting at least a portion of the partition 108. When the connection flow path 102b is opened, the first intake room 104 and the first discharge room 106 may be connected to each other.

The ventilator 100 may include the plurality of dampers 330 and 340 arranged to change the air flow path formed in the housing 101. The plurality of dampers 330 and 340 may open or close the flow paths formed in the ventilator 100.

A first damper 330 may be arranged at the first intake 101a to open or close the first intake 101a. A second damper 340 may be arranged between a side of the total heat exchanger 110 and an inner wall of the housing 101. The second damper 340 may be arranged in the connection flow path 102b. The second damper 340 may open or close the connection flow path 102b formed between the first intake 101a and the second intake 101c.

Although not shown, the second intake 101c may also have a damper (not shown) arranged therein. The damper arranged in the second intake 101c may also be referred to as a third damper. The third damper may open or close the second intake 101c.

The opening degree of each of the plurality of dampers 330 and 340 may be adjusted under the control of a process as will be described later.

When the ventilation system 1 is operating in a ventilation mode, the first damper 330 arranged at the first intake 101a is opened and the second damper 340 arranged at the connection flow path 102b is closed. In the ventilation mode, both the first air blower 109a and the second blower 109b operates. Hence, the outside air OA drawn in through the first intake 101a is discharged into the indoor space through the first outlet 101b along the intake flow path 102, and the room air RA drawn in through the second intake 101c is discharged to the outdoor space through the second outlet 101d along the discharge flow path 103.

When the ventilation system 1 operates in a heat exchanger cleaning mode, the first flow path that leads the outside air OA drawn in through the first intake 101a to the heat exchangers 120 and 130 or the second flow path that leads the room air RA drawn in through the second intake 101c to the heat exchangers 120 and 130 may be formed.

The first flow path is equal to the intake flow path 102. The second flow path is a flow path that allows the room air RA drawn in through the second intake 101c to flow back into the indoor space.

In the heat exchanger cleaning mode, the first air blower 109a may operate and the second air blower 109b may be stopped. Without operation of the second air blower 109b, flowing of the air through the discharge flow path 103 may not occur.

In the heat exchanger cleaning mode, the first damper 330 may be opened, the second damper 340 may be closed and the first air blower 109a may operate to form the first flow path. The second air blower 109b may be controlled not to operate. Accordingly, the outside air OA drawn in through the first intake 101a may pass through the filter 112 and the total heat exchanger 110 and then flow into the heat exchangers 120 and 130. The air that has passed through the heat exchangers 120 and 130 may be discharged to the indoor space through the first outlet 101b.

In the heat exchanger cleaning mode, the first damper 330 may be closed, the second damper 340 may be opened and the first air blower 109a may operate to form the second flow path. Due to the closing of the first damper 330, the first intake 101a is closed, which blocks the outside air OA from flowing into the housing 101. Furthermore, the second air blower 109b may be controlled not to operate. Accordingly, the room air RA drawn in through the second intake 101c may pass through the connection flow path 102b, pass through the filter 112 and the total heat exchanger 110 and then flow into the heat exchangers 120 and 130. The air that has passed through the heat exchangers 120 and 130 may be discharged to the indoor space through the first outlet 101b.

In the heat exchanger cleaning mode, to clean the heat exchangers 120 and 130, the first flow path or the second flow path may be selected. The selecting of the first flow path or the second flow path may be performed based on a first absolute humidity of the outside air OA flowing into the heat exchangers 120 and 130 and a second absolute humidity of the room air RA. To obtain the first absolute humidity of the outside air OA and the second absolute humidity of the room air RA, the plurality of dampers 330 and 340 may be controlled to alternately form the first flow path and the second flow path for a preset period of time (e.g., 30 seconds) each.

The heat exchangers 120 and 130 are cleaned by forming frost on the heat exchangers 120 and 130 and then defrosting. To easily form frost on the heat exchangers 120 and 130, air that contains relatively higher moisture needs to flow into the heat exchangers 120 and 130. To supply the air with relatively higher moisture to the heat exchangers 120 and 130 in the heat exchanger cleaning mode, the first absolute humidity of the outside air OA flowing into the heat exchangers 120 and 130 through the first flow path and the second absolute humidity of the room air RA flowing into the heat exchangers 120 and 130 through the second flow path may be compared.

Based on the first absolute humidity of the outside air OA flowing into the heat exchangers 120 and 130 through the first flow path being equal to or higher than the second absolute humidity of the room air RA flowing into the heat exchangers 120 and 130 through the second flow path, the first flow path may be used to clean the heat exchangers 120 and 130. Based on the first absolute humidity of the outside air OA being lower than the second absolute humidity of the room air RA, the second flow path may be used to clean the heat exchangers 120 and 130.

Figure 4:
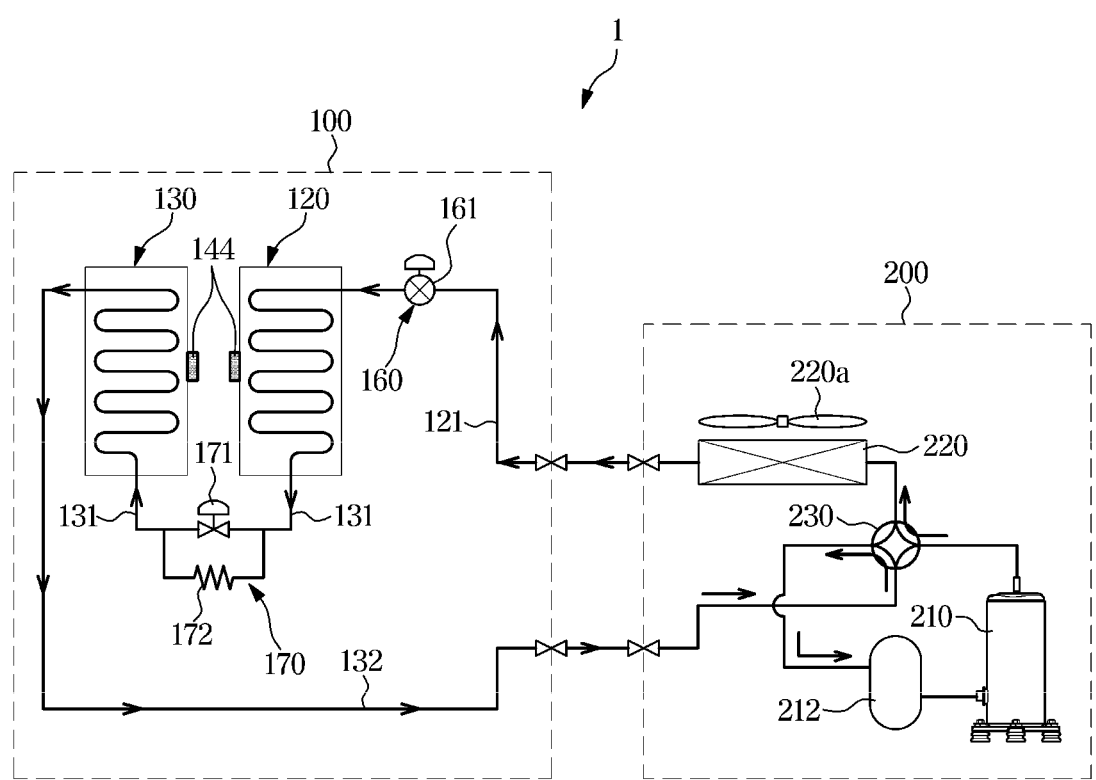
FIG. 4 illustrates circulation of a refrigerant during a ventilating operation of a ventilation system or during cleaning of a heat exchanger, according to an embodiment of the disclosure.

FIG. 4 illustrates circulation of a refrigerant during a ventilating operation of a ventilation system or during cleaning of a heat exchanger, according to an embodiment.

Referring to FIG. 4, the outdoor unit 200 may include a compressor 210 for compressing a refrigerant, an accumulator 212 for preventing a liquid refrigerant not yet evaporated from flowing into the compressor 210, an outdoor heat exchanger 220 for performing heat exchange between the outside air and the refrigerant, and a cooling fan 220*a* arranged around the outdoor heat exchanger 220. The outdoor unit 200 may also include a four-way valve 230 for switching circulation direction of the refrigerant.

The compressor 210 may operate when receiving electric energy from an external power source. The compressor 210 includes a compressor motor (not shown) and compresses a gaseous refrigerant of low pressure into high pressure by using the rotational force of the compressor motor. When the ventilation system 1 performs a ventilating operation or operates in a heat exchanger cleaning mode, the outdoor heat exchanger 220 may operate as a condenser that condenses the refrigerant.

When the ventilation system 1 operates in the ventilation mode or in the heat exchanger cleaning mode, the four-way valve 230 may be controlled to lead the refrigerant compressed by the compressor 210 to the outdoor heat exchanger 220. In other words, when the ventilation system 1 operates in the ventilation mode or in the heat exchanger cleaning mode, the refrigerant may pass through the outdoor heat exchanger 220 from the compressor 210 and may be supplied to the heat exchangers 120 and 130 in the ventilator 100.

In other operation mode, the ventilation system 1 may operate to supply warm air to the indoor space. When supply of the warm air into the indoor space is required, the outdoor heat exchanger 220 may operate as an evaporator for evaporating the refrigerant. For this, the four-way valve 230 may be controlled to lead the refrigerant compressed by the compressor 210 to the heat exchangers 120 and 130 first in the ventilator 100. In other words, the refrigerant may pass through the heat exchangers 120 and 130 in the ventilator 100 from the compressor 210 and may be supplied to the outdoor heat exchanger 220.

When the cooling fan 220*a* operates, the air outside the outdoor unit 200 may flow into the outdoor heat exchanger 220, and the air flowing into the outdoor unit 200 may pass through the outdoor heat exchanger 220 and move back to the outside of the outdoor unit 200.

The outdoor unit 200 corresponds to an outdoor unit for air conditioner commonly known to this industry, so those of ordinary skill in the art may easily change or add various components required for practice of the outdoor unit 200. As such, as the ventilation system 1 as disclosed herein may operate using the outdoor unit 200, which is commonly used, and thus, the ventilator 100 does not need such an extra component as the compressor, the ventilator 100 may become small in size and have a reduced manufacturing cost.

The first heat exchanger 120 in the ventilator 100 may be connected to the outdoor unit 200 by a first refrigerant tube 121. The first heat exchanger 120 may be connected to the outdoor heat exchanger 220 in the outdoor unit 200. The second heat exchanger 130 may be connected to the first heat exchanger 120 by a second refrigerant tube 131. The second heat exchanger 130 may be connected to the outdoor unit 200 by a third refrigerant tube 132. The second heat exchanger 130 may be connected to the accumulator 212 in the outdoor unit 200.

The ventilator 100 may include a first expansion device 160 arranged in the first refrigerant tube 121. The first expansion device 160 may selectively expand the refrigerant supplied to the first heat exchanger 120 through the first refrigerant tube 121. The refrigerant that has passed the first expansion device 160 may be in a more decompressed state than before passing through the first expansion device 160.

The ventilator 100 may include a second expansion device 170 arranged in the second refrigerant tube 131. The second expansion device 170 may selectively expand the refrigerant discharged from the first heat exchanger 120 and supplied to the second heat exchanger 130 through the second refrigerant tube 131. The refrigerant that has passed the second expansion device 170 may be in a more decompressed state than before passing through the second expansion device 170. The first expansion device 160 and the second expansion device 170 may be arranged in the housing 101. The second refrigerant tube 131 may be arranged in the housing 101.

The first expansion device 160 may expand a high temperature and high pressure refrigerant to a low temperature and low pressure refrigerant according to a throttling action, and regulate a flow rate of the refrigerant supplied to the first heat exchanger 120. The first expansion device 160 may decompress the refrigerant by using the throttling action by which the refrigerant is decompressed by passing through a narrow flow path without exchanging heat with the outside. For example, the first expansion device 160 may include an electronic expansion valve (EEV) 161. The EEV 161 may regulate the expansion degree and flow rate of the refrigerant by controlling the opening degree. When the EEV 161 is fully opened, the refrigerant may pass the EEV 161 without resistance and may not expand.

The second expansion device 170 may also expand the refrigerant according to the throttling action. For example, the second expansion device 170 may include a solenoid valve 171 and a capillary tube 172 connected in parallel with the solenoid valve 171. When the solenoid valve 171 is locked, the refrigerant may move to the capillary tube 172 to be expanded by throttling, and when the solenoid valve 171 is unlocked, the refrigerant may flow through the solenoid valve 171 without resistance and may not be expanded. To efficiently control the flow and expansion of the refrigerant, the solenoid valve 171 may be replaced by the EEV.

However, it is not limited thereto. For example, the first expansion device 160 and the second expansion device 170 may all include the EEVs. The first expansion device 160 may include a solenoid valve and a capillary tube connected in parallel with the solenoid valve, and the second expansion device 170 may include an EEV. The first expansion device 160 and the second expansion device 170 may each include a solenoid valve and a capillary tube connected in parallel with the solenoid valve. The solenoid valve connected in parallel with the capillary tube may, of course, be replaced by an EEV.

When operating in the ventilation mode of the ventilation system 1, the ventilator 100 may provide air at controlled temperature and humidity by drawing in the outside air OA and the room air RA. Hence, the indoor space may be ventilated. For the ventilation mode of the ventilation system 1, a first dehumidification mode, a second dehumidification mode, and an air blow mode may be provided. The ventilation system 1 may operate in one of the first dehumidification mode, the second dehumidification mode, and the air blow mode for the ventilating operation. The processor 193 in the ventilator 100 may control the ventilator 100 to operate the ventilator 100 in the first dehumidification mode, the second dehumidification mode, or the air blow mode.

The ventilator 100 may operate while switching into the first dehumidification mode, the second dehumidification mode, and the air blow mode based on the room temperature and the room humidity. The ventilator 100 may further include a room temperature sensor for detecting room temperature and a room humidity sensor for detecting room humidity.

The first dehumidification mode will now be described. In the first dehumidification mode, the first expansion device 160 may expand the refrigerant. The second expansion device 170 may or may not expand the refrigerant. It may be desirable that the second expansion device 170 may not expand the refrigerant in the first dehumidification mode so that the refrigerant flows smoothly. For this, the solenoid valve 171 of the second expansion device 170 may be opened in the first dehumidification mode.

When the ventilation system 1 operates in the first dehumidification mode, the high temperature and high pressure refrigerant discharged from the compressor 210 may be condensed by the outdoor heat exchanger 220 in the outdoor unit 200 and may then flow into the first expansion device 160. The first expansion device 160 may expand the high temperature and high pressure refrigerant into a low temperature and low pressure state so that the refrigerant may be evaporated by the first heat exchanger 120 and the second heat exchanger 130. The refrigerant expanded by the first expansion device 160 may flow into the first heat exchanger 120, and evaporate by exchanging heat with air passing the first heat exchanger 120. The refrigerant discharged from the first heat exchanger 120 and flowing into the second heat exchanger 130 may evaporate once again in the second heat exchanger 130. The first heat exchanger 120 and the second heat exchanger 130 may condense and remove moisture contained in the air passing the first heat exchanger 120 and the second heat exchanger 130 and may cool down the air. That is, the ventilation system 1 operating in the first dehumidification mode may reduce both temperature and humidity of the outside air drawn into the indoor space.

The air supplied into the indoor space by the ventilator 100 operating in the first dehumidification mode may have temperature and humidity that makes the user feel pleasant. The ventilator 100 operating in the first dehumidification mode discharges the cool and dry air into the indoor space, so the first dehumidification mode may be referred to as a cooling and dehumidification mode.

The second dehumidification mode will now be described. In the second dehumidification mode, the first expansion device 160 may not expand the refrigerant. The second expansion device 170 may expand the refrigerant. A high temperature and high pressure refrigerant discharged from the compressor 210 may be condensed by the outdoor heat exchanger 220 in the outdoor unit 200 and may then flow into the first heat exchanger 120. On receiving the refrigerant, the first heat exchanger 120 may condense the refrigerant. High temperature and high pressure refrigerant discharged from the first heat exchanger 120 may be expanded by the second expansion device 170 to low temperature and low pressure refrigerant. The expanded refrigerant may flow into the second heat exchanger 130 and may be evaporated by exchanging heat with air passing the second heat exchanger 130.

In the second dehumidification mode, the air moving in the intake flow path 102 may pass the second heat exchanger 130 and the first heat exchanger 120 in sequence. The second heat exchanger 130 may condense and remove moisture contained in air passing the second heat exchanger 130 and may cool and dehumidify the air passing the second heat exchanger 130. The first heat exchanger 120 may heat the air from which the moisture is removed by the second heat exchanger 130 by condensing the refrigerant. The air that has been cooled while passing the second heat exchanger 130 is heated back by the first heat exchanger 120, so the temperature may rise higher than when the air passed the second heat exchanger 130.

Hence, relative humidity of the air that has passed the second heat exchanger 130 and the first heat exchanger 120 may be further reduced than the relative humidity of air that has passed only the second heat exchanger 130. Accordingly, air having temperature and humidity that makes the user feel pleasant may be supplied into the indoor space. The ventilator 100 operating in the second dehumidification mode may discharge dry air having the same or similar temperature to the room temperature into the indoor space, so the second dehumidification mode may be referred to as a constant temperature dehumidification mode.

The air blow mode will now be described. In the air blow mode, the refrigerant may not be supplied to the first heat exchanger 120 and the second heat exchanger 130, and only heat exchange between the outside air and the room air may be performed by the total heat exchanger 110. The processor 193 may operate the ventilator 100 in the air blow mode by blocking the flow of the refrigerant flowing into the ventilator 100, blocking the refrigerant flowing into the ventilator 100 from flowing into the heat exchanger 120 or 130, or turning off the outdoor unit 200.

In the meantime, with accumulated use of the ventilator 100, foreign materials (e.g., dust) may adhere to the surface of the heat exchangers 120 and 130. Contamination of the heat exchangers 120 and 130 may deteriorate heat transfer performance of the heat exchangers 120 and 130 and lead to contamination of the air passing the heat exchangers 120 and 130. Hence, cleaning of the heat exchangers 120 and 130 is required.

The ventilation system 1 as disclosed herein may clean the heat exchangers 120 and 130 by performing a process of forming frost on the heat exchangers 120 and 130 and then defrosting the heat exchangers 120 and 130. The cleaning of the heat exchangers 120 and 130 may be referred to as freeze washing. When operating in the heat exchanger cleaning mode, the ventilation system 1 may operate the outdoor unit 200 to form frost on the heat exchangers 120 and 130 and stop operating the outdoor unit 200 to defrost the heat exchangers 120 and 130.

When the ventilation system 1 operates in the heat exchanger cleaning mode, the four-way valve 230 may be controlled to lead the refrigerant compressed by the compressor 210 to the outdoor heat exchanger 220. In other words, in the heat exchanger cleaning mode, the refrigerant may pass through the outdoor heat exchanger 220 from the compressor 210 and may be supplied to the heat exchangers 120 and 130 in the ventilator 100.

When the ventilation system 1 operates in the heat exchanger cleaning mode, the first expansion device 160 may be controlled to expand the refrigerant. The second expansion device 170 may or may not expand the refrigerant. It may be desirable that the second expansion device 170 may not expand the refrigerant in the first dehumidification mode so that the refrigerant flows smoothly. The refrigerant is evaporated by exchanging heat with surrounding air while passing the first heat exchanger 120 and the second heat exchanger 130. Accordingly, the air around the heat exchangers 120 and 130 is cooled.

When the heat exchangers 120 and 130 are operated as evaporators, the surrounding air is cooled and thus, the surface temperature of the heat exchangers 120 and 130 may drop to or below 0° C., which is the freezing point of water. Accordingly, vapor around the heat exchangers 120 and 130 may lose heat, so that frost may be formed on the surface of the heat exchangers 120 and 130. When the heat exchangers 120 and 130 are frosted, heat exchange between the refrigerant in the heat exchangers 120 and 130 and the outside air is not made. Hence, the temperature of the heat exchangers 120 and 130 continues to drop while the outdoor unit 200 is operating.

When the temperature of the heat exchangers 120 and 130 is reduced to a target temperature, operation of the outdoor unit 200 is stopped. When the operation of the outdoor unit 200 is stopped, the refrigerant is not circulated through the heat exchangers 120 and 130 in the ventilator 100, so temperatures on the surface of and around the heat exchangers 120 and 130 rise and the frost thaws. The thawed frost is changed in phase to water in a liquid state, and the water in the liquid state may flow down with the foreign materials that have adhered to the surface of the heat exchangers 120 and 130. That is, the heat exchangers 120 and 130 may be washed by frosting and defrosting.

The circulation direction of the refrigerant in the heat exchanger cleaning mode is the same as a circulation direction of the refrigerant in the ventilation mode. However, the ventilation mode and the heat exchanger cleaning mode differ in that different air flow paths are formed. Specifically, operations of the air blowers 109a and 109b and operations of the dampers 330 and 340 are differently controlled depending on the ventilation mode or the heat exchanger cleaning mode.

As described above, when the ventilation system 1 operates in the ventilation mode, both the first air blower 109a and the second air blower 109b operate. Furthermore, the first damper 330 arranged at the first intake 101a is opened and the second damper 340 arranged at the connection flow path 102b is closed. Accordingly, the outside air OA drawn in through the first intake 101a flows along the intake flow path 102 and is discharged into the indoor space through the first outlet 101b. Furthermore, the room air RA drawn in through the second intake 101c moves along the discharge flow path 103 and is then discharged to the outdoor space through the second outlet 101d.

When the ventilation system 1 operates in the heat exchanger cleaning mode, the first air blower 109a may operate and the second air blower 109b may be stopped. In other words, in the heat exchanger cleaning mode, the air may not flow through the discharge flow path 103. In the heat exchanger cleaning mode, the first flow path, which is the intake flow path 102, and the second flow path, which is the circulation flow path of the room air RA, may be formed.

The ventilation system 1 operates the compressor 210 to form frost on the heat exchangers 120 and 130 in the heat exchanger cleaning mode. Accordingly, the air passing the heat exchangers 120 and 130 is cooled.

When humidity of the air drawn into the heat exchangers 120 and 130 is lower than a preset reference humidity range, an amount of frost formed on the heat exchangers 120 and 130 is insufficient. The insufficient amount of frost may reduce the effect of cleaning the heat exchangers 120 and 130.

As an example of a method of preventing reduction in cleaning effect, a method of increasing a frosting time for forming frost may be used. The increasing of the frosting time for forming frost means increasing the operation time of the outdoor unit 200. The operation time of the outdoor unit 200 may increase by reducing the target temperature of the heat exchangers 120 and 130.

As another example of a method of preventing reduction in cleaning effect, a method of increasing the frosting speed of the heat exchangers 120 and 130 may also be used. When the target temperature of the heat exchangers 120 and 130 is fixed, the ventilation system 1 may increase the frosting speed of the heat exchangers 120 and 130. To increase the frosting speed, the ventilation system 1 may increase the first rotation speed of the compressor 210 included in the outdoor unit 200 and the second rotation speed of the first air blower 109a. With the increase of the first rotation speed of the compressor 210, the amount of refrigerant supplied to the heat exchangers 120 and 130 increases. With the increase of the second rotation speed of the first air blower 109a, the amount of air supplied to the heat exchangers 120 and 130 increases. Accordingly, the frosting speed may grow fast.

On the other hand, when humidity of the air drawn into the heat exchangers 120 and 130 is higher than a preset reference humidity range, more frost than an amount of frost required for cleaning the heat exchangers 120 and 130 may be formed. In this case, unnecessary energy may be consumed, so there is a need to reduce the frosting time to form the frost or reduce the frosting speed of the heat exchangers 120 and 130. For example, the operation time of the outdoor unit 200 may be reduced by increasing the target temperature of the heat exchangers 120 and 130. In another example, when the target temperature of the heat exchangers 120 and 130 is fixed, the frosting speed may be reduced by reducing the first rotation speed of the compressor 210 and the second rotation speed of the first air blower 109a.

Figure 5:
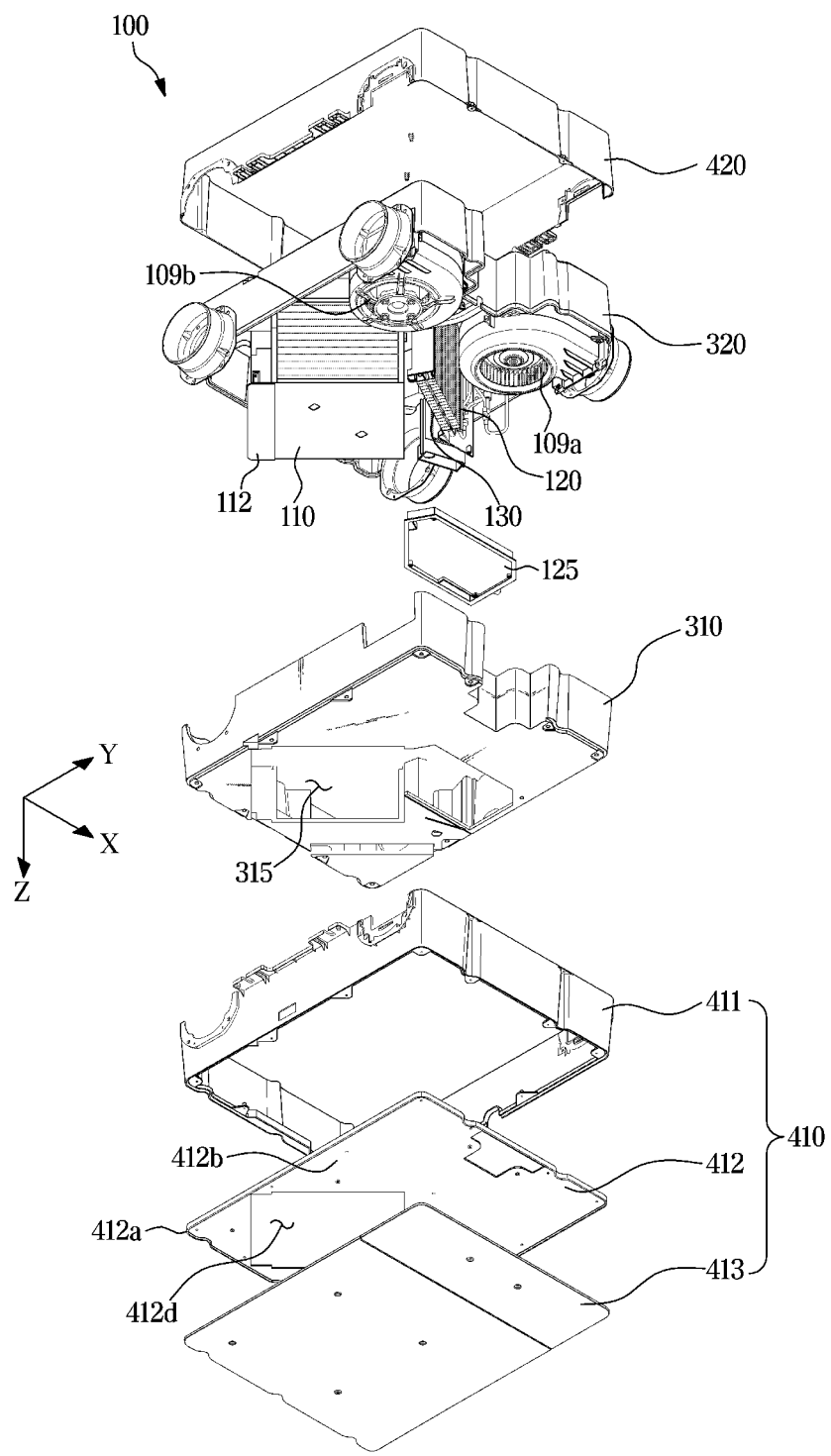
FIG. 5 is an exploded perspective view of a ventilator, according to an embodiment of the disclosure.
Figure 6:
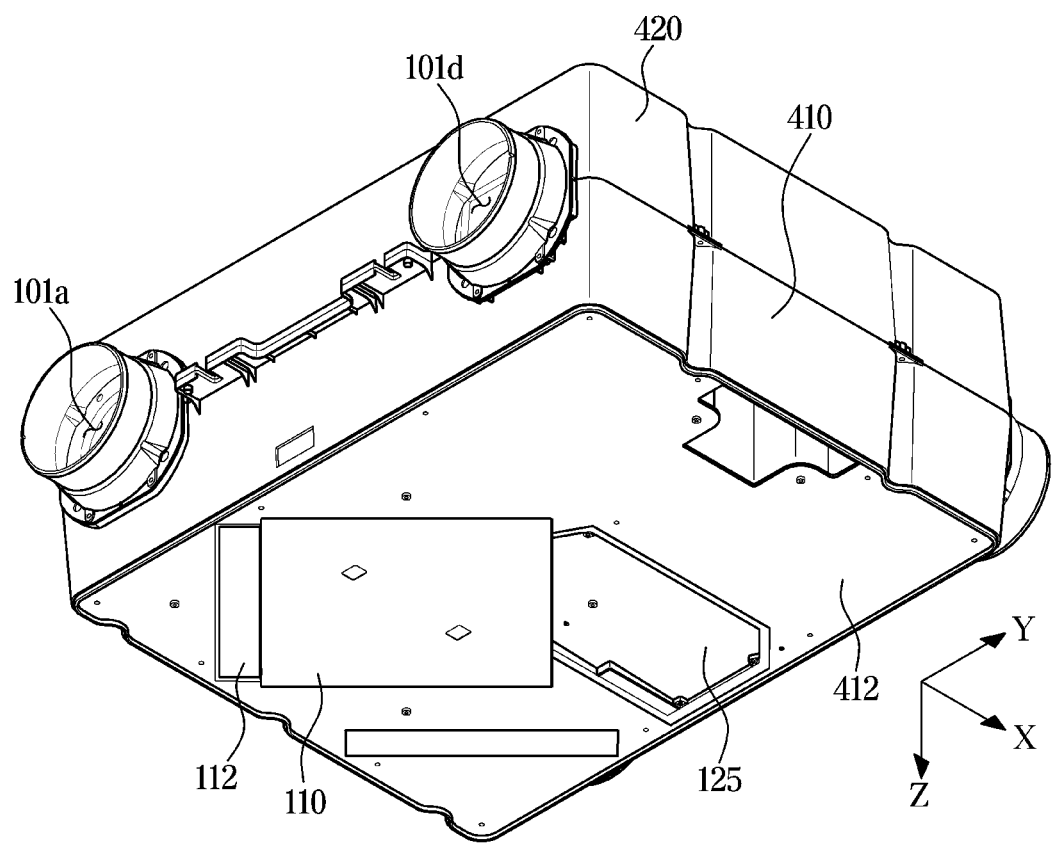
FIG. 6 is a perspective view of a ventilator with some components removed therefrom, which is viewed from below, according to an embodiment of the disclosure.
Figure 7:
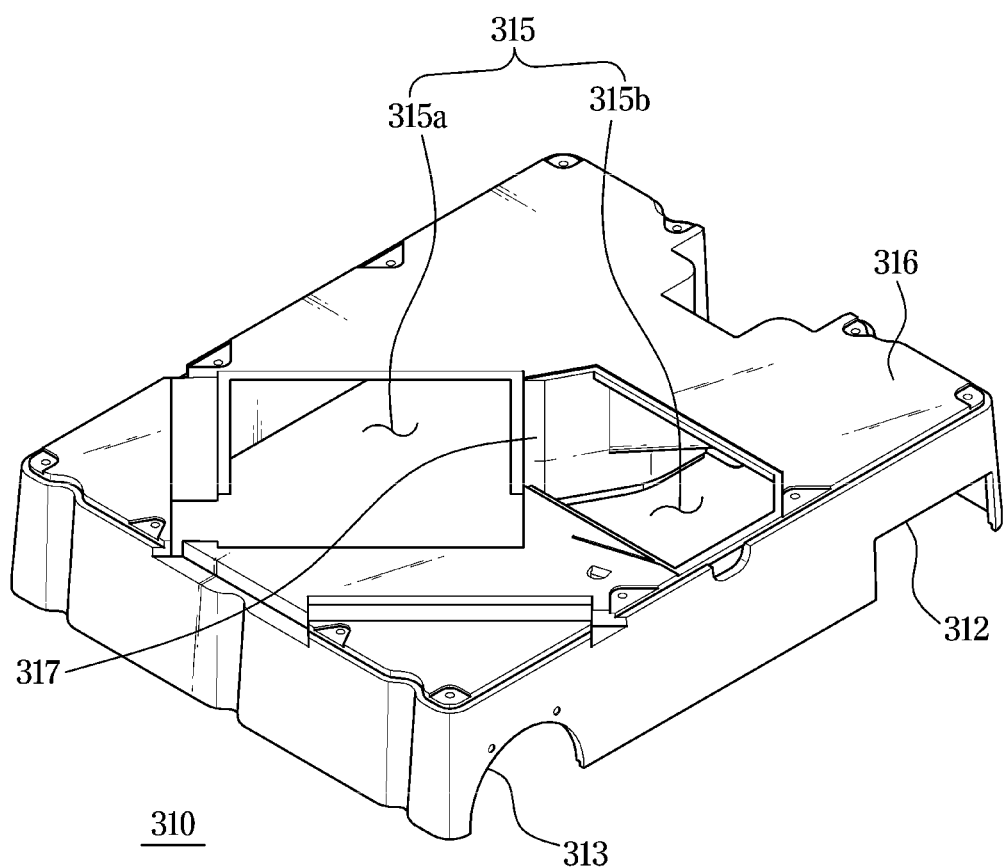
FIG. 7 is a first inner housing of the ventilator shown in FIG. 5 according to an embodiment of the disclosure, which is upside down.
Figure 8:
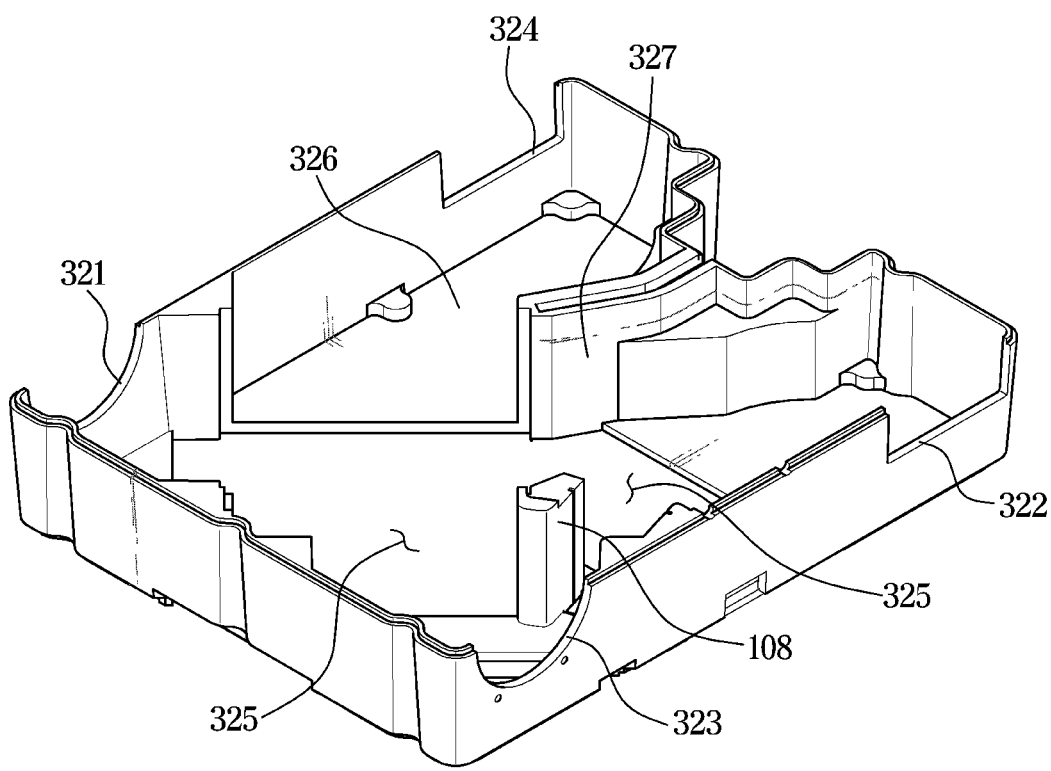
FIG. 8 is a second inner housing of the ventilator shown in FIG. 5 according to an embodiment of the disclosure, which is upside down.

FIG. 5 is an exploded perspective view of a ventilator, according to an embodiment. FIG. 6 is a perspective view of a ventilator with some components removed therefrom, which is viewed from below, according to an embodiment. FIG. 7 is a first inner housing of the ventilator shown in FIG. 5, which is upside down. FIG. 8 is a second inner housing of the ventilator shown in FIG. 5, which is upside down.

Referring to FIG. 5, the ventilator 100 may include a drain tray 125 for collecting condensate water produced from the heat exchangers 120 and 130. The drain tray 125 may be arranged under the heat exchangers 120 and 130 in the vertical direction Z.

The housing 101 may include a first inner housing 310 and a second inner housing 320. The second inner housing 320 may be coupled with the first inner housing 310 in the vertical direction Z. The inner housings 310 and 320 may be formed of an insulation material. For example, the inner housings 310 and 320 may be formed of an expanded polystyrene insulation (EPS) material such as polystyrene. It is not, however, limited thereto, and the inner housings 310 and 320 may be formed of various insulation materials provided to keep the air moving in the intake flow path 102 and the discharge flow path 103 at a constant temperature.

The ventilator 100 may include covers 410 and 420 provided to form the exterior of the housing 101 and cover the inner housings 310 and 320. The covers 410 and 420 may include a first cover 410 arranged below in the vertical direction Z and a second cover 420 arranged above and coupled to the first cover 410. The first cover 410 may form a lower exterior of the ventilator 100, and the second cover 420 may form an upper exterior of the ventilator 100. The covers 410 and 420 may protect the inner housings 310 and 320 from the outside by covering the inner housings 310 and 320. For example, the covers 410 and 420 may be made of an injection-molded material such as plastic.

The first inner housing 310 may be inserted to the first cover 410, and the second inner housing 320 may be inserted to the second cover 420. From bottom to top of the ventilator 100, the first cover 410, the first inner housing 310, the second inner housing 320 and the second cover 420 may be arranged in sequence.

The components of the ventilator 100 such as the total heat exchanger 110, the filter 112, the air blowers 109a and 109b, the heat exchangers 120 and 130, and the drain tray 125 may be arranged to be supported by the first inner housing 310 and/or the second inner housing 320.

A first hole 315 may be formed on the first inner housing 310. The total heat exchanger 110, the filter 112 and the drain tray 125 may be arranged to be separable from the ventilator 100 through the first hole 315 of the first inner housing 310. The second inner housing 320 may include a second hole 325 formed to match the first hole 315 of the first inner housing 310.

The first cover 410 may include a body part 411 shaped like a rectangular frame, a plane part 412 detachably coupled to the body part 411 and shaped like a plate, and a lower cover part 413 arranged to cover the plane part 412 from the bottom. The plane part 412 of the first cover 410 may include a plate body 412a, a first surface 412b of the plate body 412a, and a second surface arranged on the other side of the first surface 412b.

The plane part 412 of the first cover 410 may include a third hole 412d formed to match the first hole 315 of the first inner housing 310. The third hole 412d may be formed on the plate body 412a. As the third hole 412d is formed to match the first hole 315, the third hole 412d may be asymmetrically formed on the plate body 412a around one of the long axis L and the short axis S of the housing 101.

The plane part 412 of the first cover 410 may be coupled to the body part 411 to make the first surface 412b face down. The first hole 315 and the third hole 412d may be provided in the same shape and arranged to overlap each other in the vertical direction Z.

Referring to FIG. 6, when the lower cover part 413 is separated from the first cover 410, the total heat exchanger 110, the filter 112 and the drain tray 125 may be exposed downward of the ventilator 100. Accordingly, the user may easily separate the total heat exchanger 110, the filter 112 and the drain tray 125 from the ventilator 110.

Referring to FIG. 7, the first inner housing 310 may include a first intake forming part 311 forming a portion of the first intake 101a, a first outlet forming part 312 forming a portion of the first outlet 101b, a second intake forming part 313 forming a portion of the second intake 101c, and a second outlet forming part 314 forming a portion of the second outlet 101d. The first outlet forming part 312 and the second outlet forming part 314 may be formed to be symmetrical to each other about the long axis L of the ventilator 100. The first intake forming part 311 and the second intake forming part 313 may also be formed to be symmetrical to each other about the long axis L of the ventilator 100.

The first hole 315 formed for the total heat exchanger 110, the filter 112 and the drain tray 125 to be taken out may be divided into a first section 315a from which the total heat exchanger 110 and the filter 112 are taken out and a second section 315b from which the drain tray 125 is taken out. Although the first section 315a and the second section 315b of the first hole 315 are shown in the form of being connected to each other, they are not limited thereto, in which case the first section 315a and the second section 315b may be separated from each other.

The total heat exchanger 110 may be shaped like a hexahedron. As the total heat exchanger 110 is formed to have a square cross-section and the filter 112 is arranged to be adjacent to the intake air inflow end 110a of the total heat exchanger 110, the first section 315a of the first hole 315 may be formed to have a rectangular shape. Through the first section 315a of the first hole 315, the total heat exchanger 110 and the filter 112 may be exposed to the outside.

The second section 315b of the first hole 315 may be formed to have a shape matching the shape of the drain tray 125. For example, the second section 315b may be formed to have a polygonal shape, but it is not limited thereto and may have various shapes.

Referring to FIG. 8, the second inner housing 320 may include a first intake forming part 321 forming a portion of the first intake 101a, a first outlet forming part 322 forming a portion of the first outlet 101b, a second intake forming part 323 forming a portion of the second intake 101c, and a second outlet forming part 324 forming a portion of the second outlet 101d. The first outlet forming part 322 and the second outlet forming part 324 may be formed to be symmetrical to each other. The first intake forming part 321 and the second intake forming part 323 may also be formed to be symmetrical to each other.

When the first inner housing 310 and the second inner housing 320 are assembled in the vertical direction Z, the first intake 101a, the first outlet 101b, the second intake 101c and the second outlet 101d may be formed. When a surface 316 of the first inner housing and the other surface 326 of the second inner housing 320 are arranged in parallel, the first hole 315 of the first inner housing 310 and the second hole 325 of the second inner housing 320 are in parallel.

Assuming, in the front-back direction X, a side on which the first intake 101a and the second outlet 101d are formed is referred to as one side of the housing 101, and a side on which the second intake 101c and the first outlet 101b are formed is referred to as the other side of the housing 101, the total heat exchanger 110 may be arranged to be adjacent to the one side of the housing 101. As the heat exchangers 120 and 130 are arranged in the second intake room 105 to be adjacent to the first outlet 101b and the first air blower 109a, the total heat exchanger 110 may be arranged to be as close to the first intake 101a as possible to secure as much space for the second intake 105 as possible.

The first intake room 104, the second intake room 105, the first discharge room 106 and the second discharge room 107 may be separated by the partitions 108 formed by the first inner housing 310 and the second inner housing 320. Furthermore, the partitions 108 may play a role in supporting the total heat exchanger 110. The partition 108 that separates the first discharge room 105 from the second intake room 106 may be formed by a partition forming part 317 of the first inner housing 310 and a partition forming part 327 of the second inner housing 320. A connection flow path 102a may be formed by cutting at least a portion of the partition.

Figure 9:
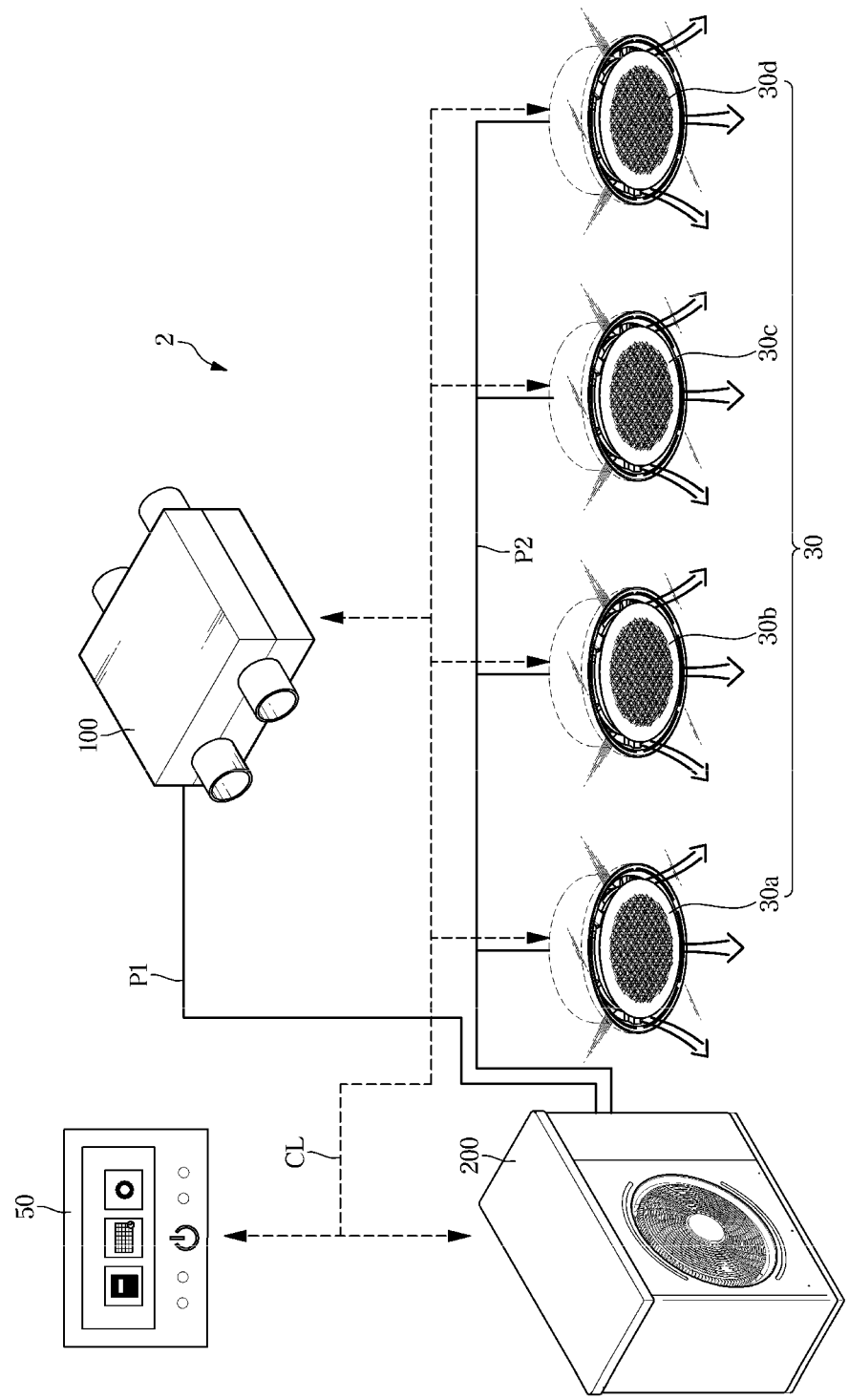
FIG. 9 illustrates an integrated air conditioning system including a ventilator, according to an embodiment of the disclosure.

FIG. 9 illustrates an integrated air conditioning system including a ventilator, according to an embodiment.

Referring to FIG. 9, an integrated air conditioning system 2 may include the ventilator 100, the outdoor unit 200, a plurality of indoor units 30 (30a, 30b, 30c and 30d) and an integrated controller 50. The ventilator 100 may be connected to the outdoor unit 200 by a refrigerant pipe P1. The refrigerant pipe P1 may correspond to the first refrigerant tube 121 as described above. The plurality of indoor units 30 may be connected to the outdoor unit 200 by a refrigerant pipe P2. The outdoor unit 200 may supply the refrigerant to each of the plurality of indoor units 30 through the refrigerant pipe P2.

The plurality of indoor units 30 may be installed in a plurality of different indoor spaces, respectively. For example, the plurality of indoor units 30 may be installed in a plurality of offices, a plurality of guest rooms or a plurality of rooms separated in a building, respectively. As the plurality of indoor units 30 respectively operate, air in the indoor space where each of the plurality of indoor units 30 is installed may be directly conditioned (e.g., cooled).

The ventilator 100 may be installed in many different spaces in the building. For example, the ventilator 100 may be installed in such a space as an apartment balcony or a utility room. The first intake 101a, the second intake 101c, the first outlet 101b and the second outlet 101d formed at the housing 101 of the ventilator 100 may be connected to the respective ducts. A duct connected to the second intake 101c and the first outlet 101b may extend up to the indoor space. For example, there may be a hole formed on the ceiling or the wall of the indoor space to be connected to the ventilator 100. A duct connected to the first intake 101a and the second outlet 101d may extend up to the outdoor space.

The integrated controller 50 may be electrically connected to the ventilator 100, the outdoor unit 500 and the plurality of indoor units 30. The integrated controller 50 may be electrically connected to the ventilator 100, the outdoor unit 500 and the plurality of indoor units 30 through a communication line (CL). The integrated controller 50 may control operations of the ventilator 100, the outdoor unit 200 and the plurality of indoor units 30.

The integrated controller 50 may obtain a user input, and in response to the user input, operate the integrated air conditioning system 2 and display information of the integrated air conditioning system 2. The integrated controller 50 may control the ventilator 100 and the indoor unit 30 based on the room temperature and the room humidity in the indoor space where the indoor unit 30 is placed. Cooling efficiency and dehumidification efficiency may increase and energy for cooling and dehumidification may be saved by adequately controlling operations of the ventilator 100 and the indoor unit 30.

As such, one outdoor unit 200 may be used to supply the refrigerant to the ventilator 100 and the plurality of indoor units 30. The numbers of the ventilator 100, the outdoor unit 200 and the indoor unit 30 are not limited to what are illustrated above.

The method of controlling the ventilation system 1 may also be used for the integrated air conditioning system 2 as described above in connection with FIG. 9.

Figure 10:
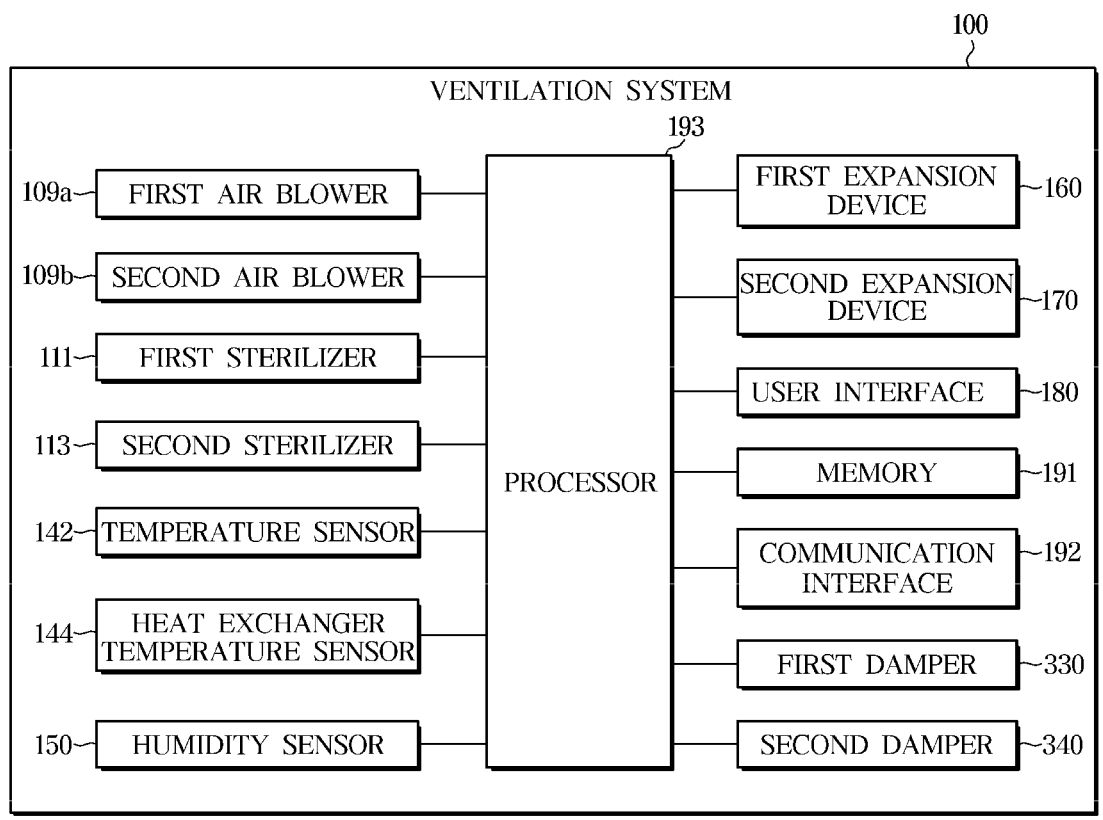
FIG. 10 is a control block diagram of a ventilator, according to an embodiment of the disclosure.

FIG. 10 is a control block diagram of a ventilator, according to an embodiment.

Referring to FIG. 10, the ventilator 100 may include the first air blower 109a, the second air blower 109b, the first sterilizer 111, the second sterilizer 112, the temperature sensor 142, the heat exchanger temperature sensor 144, the humidity sensor 150, the first expansion device 160 and the second expansion device 170. Furthermore, the ventilator 100 may include a user interface 180, a memory 191, a communication interface 192, a processor 193, the first damper 330 and the second damper 340. The processor 193 may be electrically connected to the components of the ventilator 100 to control the respective components.

The processor 193 may control the first expansion device 160 to selectively expand the refrigerant supplied to the first heat exchanger 120 through the first refrigerant tube 121. The processor 193 may control the second expansion device 170 to selectively expand the refrigerant discharged from the first heat exchanger 120 and supplied to the second heat exchanger 130 through the second refrigerant tube 131.

The user interface 180 may obtain various user inputs about operations of the ventilator 100. The user interface 180 may output an electric signal (voltage or current) corresponding to a user input to the processor 193 of the ventilator 100. The user interface 180 may include various buttons, a dial and/or a display. The display of the user interface 180 may display information about the operation of the ventilation system 1.

For example, the user interface 180 may obtain a command to perform the heat exchanger cleaning mode. The processor 193 may operate the ventilation system 1 in the heat exchanger cleaning mode based on the command to perform the heat exchanger cleaning mode. The user interface 180 may obtain a user input to arrange a schedule for heat exchanger cleaning. The schedule for heat exchanger cleaning may be set in advance on a design basis. The processor 193 may periodically perform the heat exchanger cleaning operation based on the schedule for cleaning the heat exchanger.

The memory 191 may memorize/store various information required for operation of the ventilation system 1. The memory 191 may store instructions, an application, data and/or a program required for operation of the ventilation system 1. The processor 193 may generate control signals for controlling operation of the ventilation system 1 based on the instructions, application, data and/or program stored in the memory 191.

The communication interface 192 may perform communication with the outdoor unit 200, the indoor unit 30 and/or the integrated controller 50. The ventilator 1 may operate based on a control signal transmitted from the integrated controller 50 through the communication interface 192. Furthermore, the processor 193 of the ventilator 100 may generate a control signal for operating the outdoor unit 200 and transmit the control signal to the outdoor unit 200 through the communication interface 192.

As described above, with accumulated use of the ventilator 100, the heat exchangers 120 and 130 may be contaminated. To manage the heat exchangers 120 and 130 to be clean, cleaning of the heat exchangers 120 and 130 is required. The ventilation system 1 as disclosed herein may clean the heat exchangers 120 and 130 by performing a process of forming frost on the heat exchangers 120 and 130 and then defrosting the heat exchangers 120 and 130.

In this case, when the amount of frost formed on the heat exchangers 120 and 130 is insufficient, the effect of cleaning the heat exchangers 120 and 130 may be reduced. On the other hand, when more frost than the amount of frost required for cleaning the heat exchangers 120 and 130 is formed, unnecessary energy may be consumed. To solve these problems, the ventilation system 1 as disclosed herein may select an appropriate air flow path to easily form frost on the heat exchangers 120 and 130 and appropriately control the frosting time for forming frost. Furthermore, the ventilation system 1 may appropriately control the frosting speed of the heat exchangers 120 and 130.

The processor 193 may periodically perform cleaning on the heat exchangers 120 and 130 based on a preset schedule. In addition, the processor 193 may perform cleaning on the heat exchangers 120 and 130 based on a command obtained through the user interface 180. The processor 193 may control the outdoor unit 200 to supply the refrigerant to the heat exchangers 120 and 130 based on entering the heat exchanger cleaning mode.

In response to entering the heat exchanger cleaning mode, the processor 193 may control the plurality of dampers 330 and 340, the first air blower 109a and the second air blower 109b to form the first flow path that leads the outside air OA drawn in through the first intake 101a of the housing 101 to the heat exchangers 120 and 130 or the second flow path that leads the room air RA drawn in through the second intake 101c to the heat exchangers 120 and 130.

To form the first flow path, the processor 193 may open the first damper 330 to open the first intake 101a and close the second damper 340 to close the connection flow path 102b. To form the second flow path, the processor 193 may close the first damper 330 to close the first intake 101a and open the second damper 340 to open the connection flow path 102b. The processor 193 may control the plurality of dampers 330 and 340 to alternately form the first flow path and the second flow path for a preset period of time (e.g., 30 seconds) each, in response to entering the heat exchanger cleaning mode.

The temperature sensor 142 may detect temperature of the air flowing into the heat exchangers 120 and 130. The temperature sensor 142 may also be referred to as a first temperature sensor. The temperature sensor 142 may detect first temperature of the outside air OA flowing into the heat exchangers 120 and 130 through the first flow path, which is the intake flow path 102. The temperature sensor 142 may detect second temperature of the room air RA flowing into the heat exchangers 120 and 130 through the second flow path.

The heat exchanger temperature sensor 144 may detect temperature of the heat exchangers 120 and 130. The heat exchanger temperature sensor 144 may also be referred to as a second temperature sensor.

The humidity sensor 150 may measure relative humidity of the air flowing into the heat exchangers 120 and 130. The humidity sensor 150 may detect first relative humidity of the outside air OA flowing into the heat exchangers 120 and 130 through the first flow path, which is the intake flow path 102. The humidity sensor 150 may detect second relative humidity of the room air RA flowing into the heat exchangers 120 and 130 through the second flow path.

The processor 193 may calculate a first absolute humidity of the outside air OA based on the first temperature and the first relative humidity of the outside air OA flowing through the first flow path. The processor 193 may calculate a second absolute humidity of the room air RA based on the second temperature and the second relative humidity of the room air RA flowing through the second flow path. The processor 193 may select one of the first flow path and the second flow path based on comparison between the first absolute humidity and the second absolute humidity. In other words, the first flow path or the second flow path may be used to clean the heat exchangers 120 and 130).

The processor 193 may select the first flow path based on the first absolute humidity of the outside air OA equal to or higher than the second absolute humidity of the room air RA. The processor 193 may select the second flow path based on the first absolute humidity of the outside air OA lower than the second absolute humidity of the room air RA. The processor 193 may control the display of the user interface 180 to display flow path information regarding selection of one of the first flow path and the second flow path.

In the heat exchanger cleaning mode, the processor 193 may operate the outdoor unit 200 to form frost on the heat exchangers 120 and 130 and stop operating the outdoor unit 200 to defrost the heat exchangers 120 and 130 based on a preset frosting termination condition. The processor 193 may control the display of the user interface 180 to display an expected time required until cleaning of the heat exchangers 120 and 130 is completed after the operation of the outdoor unit 200 is terminated based on the frosting termination condition.

For example, the frosting termination condition may include the operation time of the outdoor unit 200 reaching a preset limit time (e.g., 20 minutes) or the third temperature of the heat exchangers 120 and 130 reaching a target temperature. The processor 193 may determine to stop operating the outdoor unit 200 based on the temperature detected by the heat exchanger temperature sensor 144 being equal to or lower than the target temperature. Furthermore, the processor 193 may also determine to stop operating the outdoor unit 200 based on the operation time of the outdoor unit 200 elapsing the preset limit time after entering the heat exchanger cleaning mode.

In the heat exchanger cleaning mode, the processor 193 may determine the target temperature of the heat exchangers 120 and 130 based on a preset correlation function. The processor 193 may calculate the target temperature of the heat exchangers 120 and 130 based on entering the heat exchanger cleaning mode. The processor 193 may calculate the target temperature of the heat exchangers 120 and 130 based on selecting the first flow path or the second flow path.

The correlation function includes temperature and humidity of the air flowing into the heat exchangers 120 and 130 as variables. For example, the correlation function may include the first temperature and the first relative humidity of the outside air OA supplied to the heat exchangers 120 and 130 as variables. Furthermore, the correlation function may include the second temperature and the second relative humidity of the room air RA supplied to the heat exchangers 120 and 130 as variables.

In other words, the target temperature is calculated by inputting the first temperature and the first relative humidity of the outside air OA to the correlation function or inputting the second temperature and the second relative humidity of the room air RA to the correlation function. The correlation function may be defined as in the following equation 1. Equation 1 is merely an example. The correlation function may be defined in various equations according to data of the ventilator 100.

$$\text{Target temperature} = f(\text{temperature}, \text{relative humidity})$$
$$= -63.6 + (1.783 * \text{temperature}) + (11.63 * \text{relative humidity})$$

[Equation 1]

The operation time of the outdoor unit 200 may be adjusted with a change in target temperature of the heat exchangers 120 and 130. When the target temperature of the heat exchangers 120 and 130 is lowered, the operation time of the outdoor unit 200 may increase. It is because more time is required to reduce the temperature of the heat exchangers 120 and 130 to the target temperature. On the contrary, when the target temperature of the heat exchangers 120 and 130 increases, the operation time of the outdoor unit 200 may be reduced. The heat exchangers 120 and 130 need to be frosted, so the target temperature may be determined to have a value lower than a preset threshold temperature (e.g., −5° C.).

Alternatively, the target temperature of the heat exchangers 120 and 130 may be fixed in a design stage of the ventilator 100. When the target temperature of the heat exchangers 120 and 130 is fixed, the frosting speed of the heat exchangers 120 and 130 may be adjusted. To adjust the frosting speed of the heat exchangers 120 and 130, the first rotation speed of the compressor 210 and the second rotation speed of the first air blower 109a may be adjusted.

For example, with the increase of the first rotation speed of the compressor 210, the amount of refrigerant supplied to the heat exchangers 120 and 130 increases. With the increase of the second rotation speed of the first air blower 109a, the amount of air supplied to the heat exchangers 120 and 130 increases. Accordingly, the frosting speed may grow fast. On the contrary, with the decrease of the first rotation speed of the compressor 210 and the second rotation speed of the first air blower 109a, the frosting speed may slow down.

The processor 193 may determine the first rotation speed of the compressor 210 included in the outdoor unit 200 and the second rotation speed of the first air blower 109a based on the first relative humidity of the outside air OA supplied to the heat exchangers 120 and 130 or the second relative humidity of the room air RA. For example, the processor 193 may reduce the first rotation speed of the compressor 210 and the second rotation speed of the first air blower 109a based on the first relative humidity of the outside air OA or the second relative humidity of the room air RA higher than the preset reference humidity range. In another example, the processor 193 may increase the first rotation speed of the compressor 210 and the second rotation speed of the first air blower 109a based on the first relative humidity of the outside air OA or the second relative humidity of the room air RA lower than the preset reference humidity range.

In the heat exchanger cleaning mode, the processor 193 may operate the first air blower 109a and stop the second air blower 109b. To form frost on the heat exchangers 120 and 130, air needs to be continuously supplied to the heat exchangers 120 and 130 during operation of the outdoor unit 200. To supply the air to the heat exchangers 120 and 130, the first air blower 109a may be operated. However, when the operation of the outdoor unit 200 is stopped for defrosting, the processor 193 may stop operating the first air blower 109a until the frost thaws. To remove moisture left after the frost thaws, the processor 193 may operate the first air blower 109a again.

Figure 11:
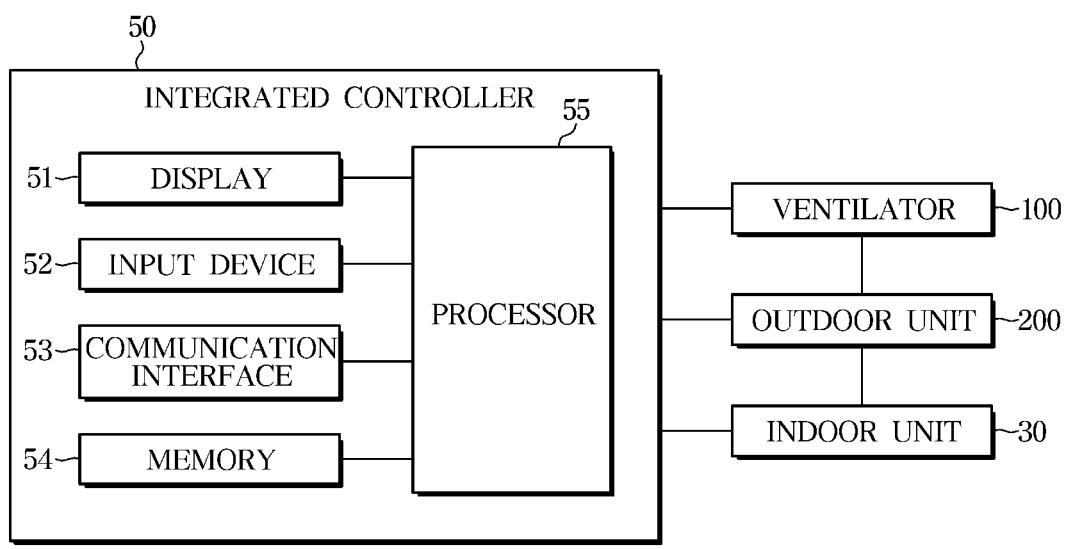
FIG. 11 is a control block diagram of an integrated controller, according to an embodiment of the disclosure.

FIG. 11 is a control block diagram of an integrated controller, according to an embodiment.

Referring to FIG. 11, the integrated controller 50 may include a display 51, an input device 52, a communication interface 53, a memory 54, and a processor 55 electrically connected to the components. The integrated controller 50 may provide a user interface for interactions between the integrated air conditioning system 2 and the user.

The display 51 may display information regarding a state and/or operation of the integrated air conditioning system 2. The display 51 may display information input by the user or information to be provided for the user in various screens. The display 51 may display information regarding an operation of the integrated air conditioning system 2 in at least one of an image or text. Furthermore, the display 51 may display a graphic user interface (GUI) that enables the integrated air conditioning system 2 to be controlled. Hence, the display 51 may display a user interface element (UI element) such as an icon.

The display 51 may include a display panel of various types. For example, the display 51 may include a liquid crystal display (LCD) panel, a light emitting diode (LED) panel, an organic LED (OLED) panel, or a micro LED panel.

The display 51 may be implemented with a touch display. The touch display may include a display panel for displaying an image and a touch panel for receiving a touch input. The display panel may convert image data received from the processor 55 to an optical signal visible to the user. The touch panel may identify a touch input from the user and provide an electric signal corresponding to the received touch input to the processor 55.

The input device 52 of the integrated controller 50 may output an electric signal (voltage or current) corresponding to the user input to the processor 55. The input module 52 may include various buttons and even a dial. When the display 51 is provided as a touch display, the input device 52 may not be provided separately for the integrated controller 50. That is, the integrated controller 50 may obtain a user input. For example, the integrated controller 50 may obtain a user input to turn on or turn off each of the indoor unit 30 and the ventilator 100 or a user input to set an operation mode of each of the indoor unit 30 and the ventilator 100.

The communication interface 53 may perform communication with the ventilator 100, the outdoor unit 200 and the indoor unit 30. The communication interface 53 of the integrated controller 50 may be connected to a communication interface of each of the indoor unit 30, the ventilator 100, the outdoor unit 200 through the communication line (CL). The integrated controller 50 may transmit control signals to the ventilator 100, the outdoor unit 500 and the indoor unit 30 through the communication interface 53.

The communication interface 53 may include a wired communication module and/or a wireless communication module to communicate with an external device (e.g., a mobile device, a computer). The wired communication module may communicate with an external device over a wide area network such as the Internet, and the wireless communication module may communicate with an external device through an access point connected to a wide area network. With this, the user may remotely control the integrated air conditioning system 2.

The memory 54 may memorize/store various information required for operation of the integrated air conditioning system 2. The memory 54 may store instructions, an application, data and/or a program required for operation of the integrated air conditioning system 2. For example, the memory 54 may store data about reference temperature and reference humidity for determining operations of the ventilator 100 and the indoor unit 30.

The memory 54 may include a volatile memory for temporarily storing data, such as a static random access memory (SRAM), or a dynamic random access memory (DRAM). The memory 54 may also include a non-volatile memory for storing data for a long time, such as a read-only memory (ROM), an erasable programmable ROM (EPROM), or an electrically erasable programmable ROM (EEPROM).

The processor 55 may generate control signals for controlling operation of the integrated air conditioning system 2 based on the instructions, application, data and/or program stored in the memory 54. The processor 55 may include logic circuits and operation circuits in hardware. The processor 55 may process the data according to the program and/or instructions provided from the memory 54 and generate a control signal based on the processing result. The memory 54 and the processor 55 may be implemented in one control circuit or in multiple circuits.

The components of the ventilator 100, the outdoor unit 200, the indoor unit 30 and the integrated controller 50 are not limited to the components as described above in connection with FIGS. 10 and 11. Some of the aforementioned components of each of the ventilator 100, the outdoor unit 200, the indoor unit 30 and the integrated controller 50 may be omitted, or other components may further be added.

Figure 12:
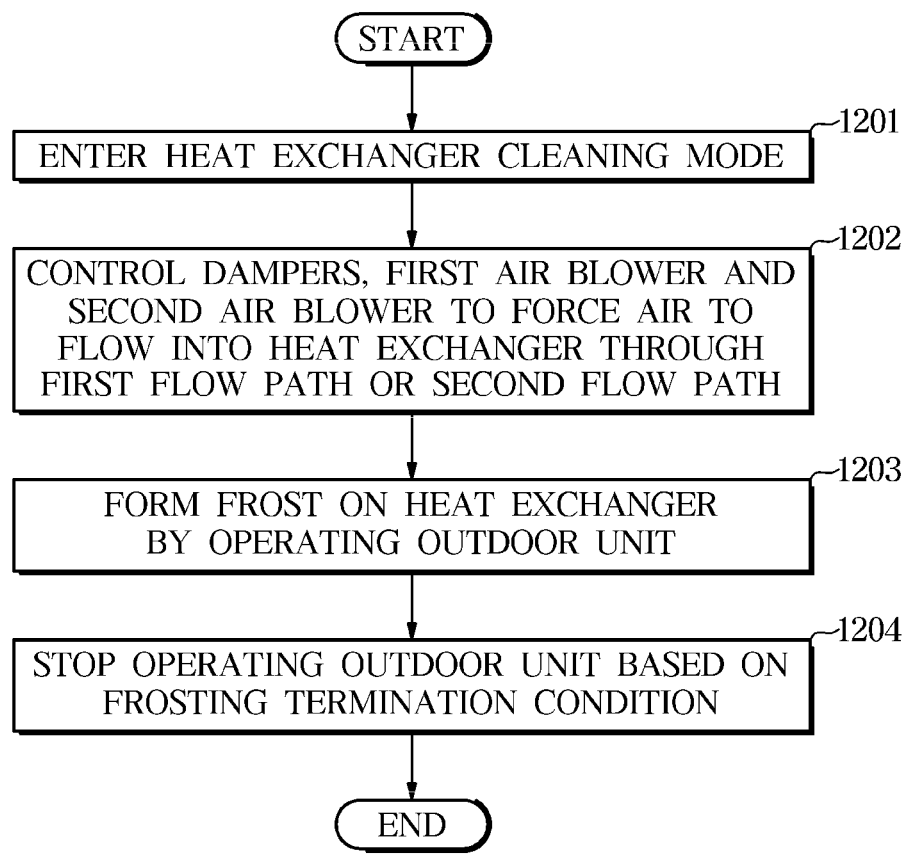
FIG. 12 is a flowchart describing a method of controlling a ventilation system, according to an embodiment of the disclosure.

FIG. 12 is a flowchart describing a method of controlling a ventilation system, according to an embodiment.

Referring to FIG. 12, the ventilation system 1 may operate in the heat exchanger cleaning mode, in 1201. For example, the processor 193 of the ventilation system 1 may enter the heat exchanger cleaning mode based on a user input obtained through the user interface 180. The processor 193 may enter the heat exchanger cleaning mode based on a preset heat exchanger cleaning schedule.

In response to the ventilation system 1 entering the heat exchanger cleaning mode, the processor 193 of the ventilation system 1 may control the plurality of dampers 330 and 340, the first air blower 109a and the second air blower 109b to force the air to flow into the heat exchangers 120 and 130. The processor 193 may control the plurality of dampers 330 and 340, the first air blower 109a and the second air blower 109b to form the first flow path that leads the outside air OA drawn in through the first intake 101a of the housing 101 to the heat exchangers 120 and 130 or the second flow path that leads the room air RA drawn in through the second intake 101c to the heat exchangers 120 and 130.

To easily form frost on the heat exchangers 120 and 130, air that contains relatively much moisture needs to flow into the heat exchangers 120 and 130. One of the first flow path and the second flow path may be selected to supply the air containing relatively much moisture in the heat exchanger cleaning mode to the heat exchangers 120 and 130.

The processor 193 may operate the outdoor unit 200 to form frost on the heat exchangers 120 and 130 in the heat exchanger cleaning mode, in 1203. Afterward, the processor 193 may stop operating the outdoor unit 200 to defrost the heat exchangers 120 and 130 based on a preset frosting termination condition, in 1204. The heat exchangers 120 and 130 may be cleaned by forming frost on the heat exchangers 120 and 130 and then defrosting.

Figure 13:
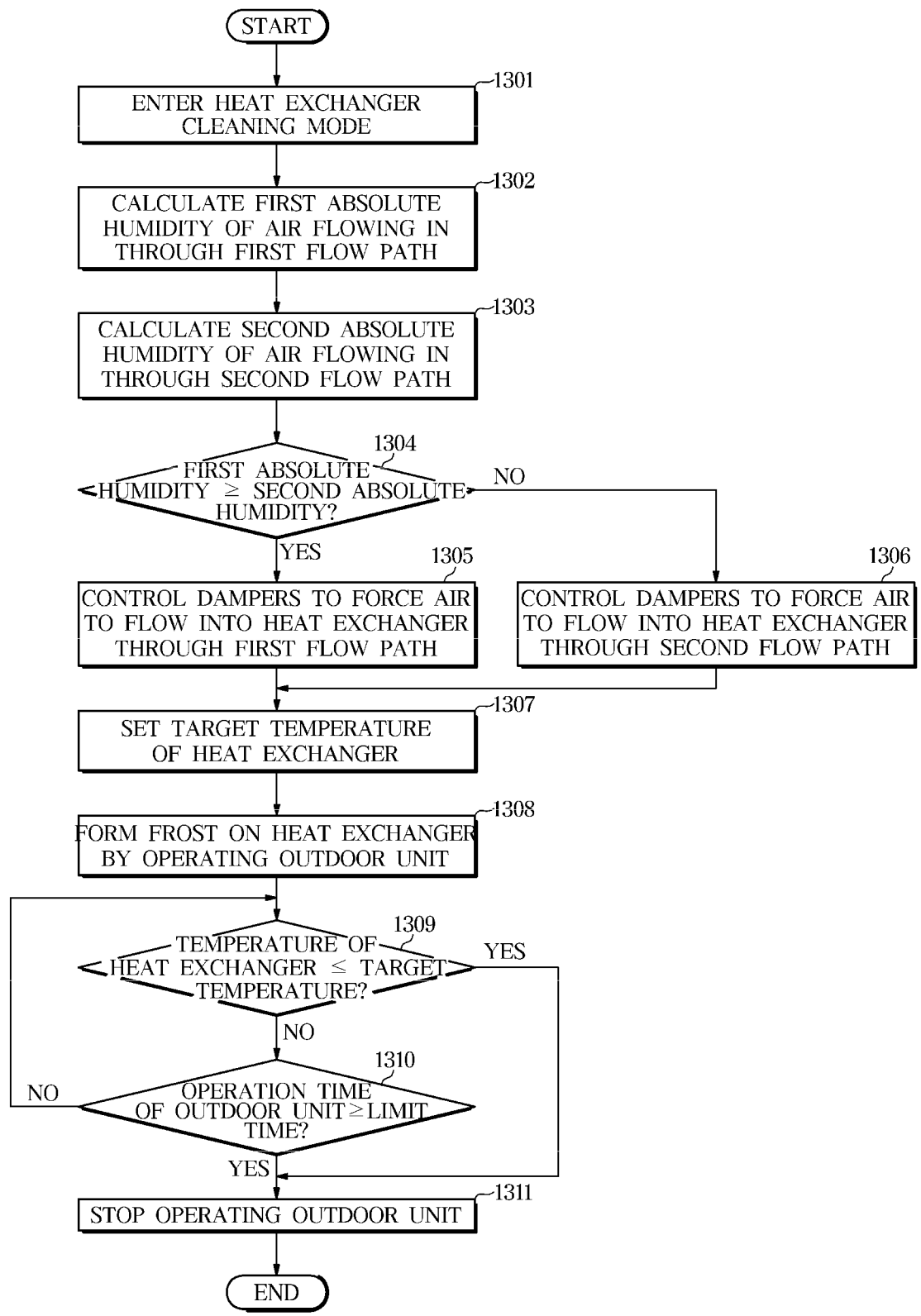
FIG. 13 is a flowchart illustrating the method of controlling the ventilation system described in FIG. 12 in more detail according to an embodiment of the disclosure.

FIG. 13 is a flowchart illustrating the method of controlling the ventilation system described in FIG. 12 in more detail.

Referring to FIG. 13, the processor 193 of the ventilation system 1 may control the plurality of dampers 330 and 340 to alternately form the first flow path and the second flow path for a preset period of time (e.g., 30 seconds) each, in response to entering the heat exchanger cleaning mode.

The processor 193 may open the first damper 330, close the second damper 340 and operate the first air blower 109a to form the first flow path for the preset period of time (e.g., 30 seconds). Accordingly, the outside air OA drawn in through the first intake 101a may flow into the heat exchangers 120 and 130 through the first flow path. The temperature sensor 142 may detect first temperature of the outside air OA flowing in through the first flow path. The humidity sensor 150 may detect first relative humidity of the outside air OA flowing in through the first flow path. The processor 193 may calculate the first absolute humidity of the outside air OA based on the first temperature and the first relative humidity of the outside air OA in 1302.

Furthermore, the processor 193 may close the first damper 330, open the second damper 340 and operate the first air blower 109a to form the second flow path for the preset period of time (e.g., 30 seconds). Accordingly, the room air RA drawn in through the second intake 101c may flow into the heat exchangers 120 and 130 through the second flow path. The temperature sensor 142 may detect second temperature of the room air RA flowing in through the second flow path. The humidity sensor 150 may detect second relative humidity of the room air RA flowing in through the second flow path. The processor 193 may calculate the second absolute humidity of the room air RA based on the second temperature and the second relative humidity of the room air RA in 1303.

The processor 193 may select one of the first flow path and the second flow path based on comparison between the first absolute humidity and the second absolute humidity. The processor 193 may select the first flow path based on the first absolute humidity of the outside air OA equal to or higher than the second absolute humidity of the room air RA, in 1304 and 1305. The processor 193 may control the plurality of dampers 330 and 340 to supply air to the heat exchangers 120 and 130 through the first flow path to form frost on the heat exchangers 120 and 130.

The processor 193 may select the second flow path based on the first absolute humidity of the outside air OA lower than the second absolute humidity of the room air RA, in 1304 and 1306. The processor 193 may control the plurality of dampers 330 and 340 to supply air to the heat exchangers 120 and 130 through the second flow path to form frost on the heat exchangers 120 and 130.

The processor 193 may determine the target temperature of the heat exchangers 120 and 130, in 1307. The processor 193 may calculate the target temperature of the heat exchangers 120 and 130 based on the selection of the first flow path or the second flow path. The processor 193 may determine the target temperature of the heat exchangers 120 and 130 based on temperature of the air flowing into the heat exchangers 120 and 130, relative humidity of the air, and a preset correlation function.

The processor 193 may operate the outdoor unit 200 to form frost on the heat exchangers 120 and 130, in 1308. The rotation speed of the compressor 210 may remain constant until the operation of the outdoor unit 200 is stopped. The rotation speed of the first air blower 109a may also remain constant. As the frost is formed on the heat exchangers 120 and 130, the temperature of the heat exchangers 120 and 130 goes down. The processor 193 may stop operating the outdoor unit 200 when the temperature of the heat exchangers 120 and 130 is reduced to the target temperature, in 1309 and 1311.

Even when the temperature of the heat exchangers 120 and 130 does not reach the target temperature, the processor 193 may stop operating the outdoor unit 200 when the driving time of the outdoor unit 200 elapses a preset limit time (e.g., 20 minutes), in 1310 and 1311.

Figure 14:
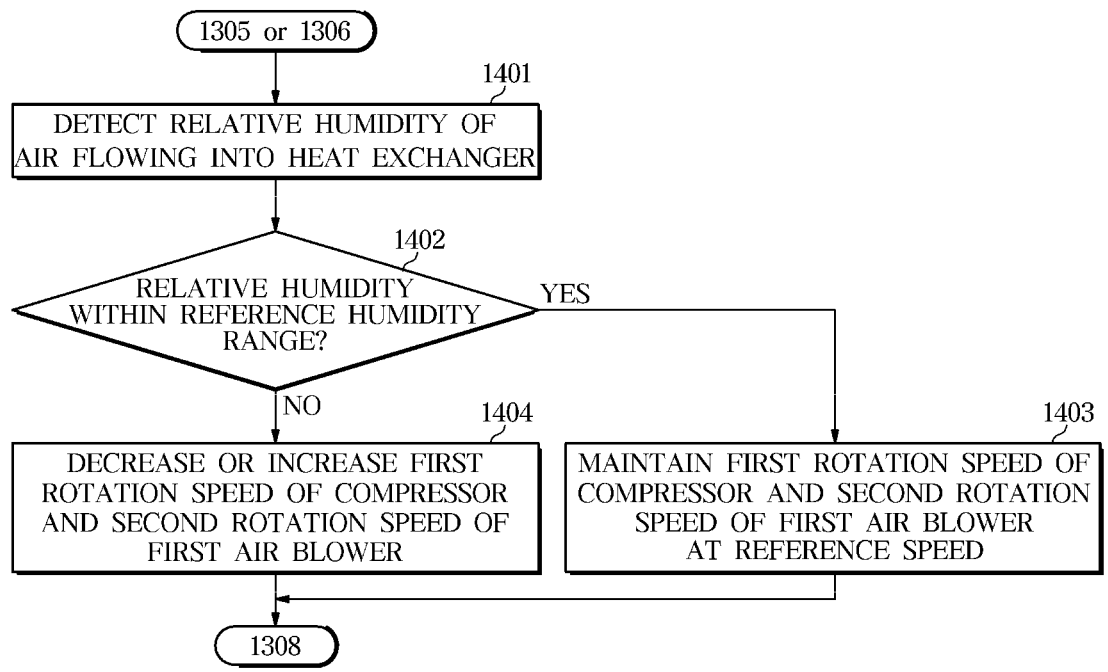
FIG. 14 is a flowchart illustrating the method of controlling the ventilation system described in FIG. 13 with some steps changed according to an embodiment of the disclosure.

FIG. 14 is a flowchart illustrating the method of controlling the ventilation system described in FIG. 13 with some steps changed.

Referring to FIG. 14, the target temperature of the heat exchangers 120 and 130 may be fixed in a design stage of the ventilator 100. When the target temperature of the heat exchangers 120 and 130 is fixed, the frosting speed of the heat exchangers 120 and 130 may be adjusted. To adjust the frosting speed of the heat exchangers 120 and 130, the first rotation speed of the compressor 210 and the second rotation speed of the first air blower 109a may be adjusted.

As described in FIG. 13, after selecting the first flow path in 1305 or the second flow path in 1306, the processor 193 may control the humidity sensor 150 to detect relative humidity of the air flowing into the heat exchangers 120 and 130 through the first flow path or the second flow path, in 1401.

The processor 193 may set the first rotation speed of the compressor 210 to a preset first reference speed and the second rotation speed of the first air blower 109a to a preset second reference speed in 1403, when the detected relative humidity of the air is within a preset reference humidity range.

The processor 193 may reduce the first rotation speed of the compressor 210 and the second rotation speed of the first air blower 109*a* based on the detected relative humidity of the air higher than the preset reference humidity range. The processor 193 may increase the first rotation speed of the compressor 210 and the second rotation speed of the first air blower 109*a* based on the detected relative humidity of the air lower than the preset reference humidity range, in 1404.

According to the disclosure, a ventilation system may clean a heat exchanger by forming frost on a heat exchanger inside a ventilator and then melting the frost.

The ventilation system may effectively clean the heat exchanger by selectively changing the flow path of air flowing into the heat exchanger.

The ventilation system may also prevent poor cleaning of the heat exchanger and prevent unnecessary energy consumption by appropriately setting a condition to terminate the cleaning of the heat exchanger.

Meanwhile, the embodiments of the disclosure may be implemented in the form of a storage medium for storing instructions to be carried out by a computer. The instructions may be stored in the form of program codes, and when executed by a processor, may generate program modules to perform operation in the embodiments of the disclosure.

The machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

The aforementioned methods according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play store™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. A ventilation system comprising:
 a ventilator; and
 an outdoor unit,
 wherein the ventilator includes:
  a housing including a first intake, a second intake, a first outlet and a second outlet,
  a plurality of dampers configured to change flow paths of air flowing through the housing,
  a first air blower configured to blow the air to the first outlet,
  a second air blower configured to blow the air to the second outlet,
  a total heat exchanger in the housing,
  a heat exchanger in the housing, and
  a processor configured to, in response to entering a heat exchanger cleaning mode:
   control the plurality of dampers, the first air blower, and the second air blower to
    form a first flow path in which outside air is drawn in through the first intake, then flows through an intake air inflow end of the total heat exchanger, then flows through the total heat exchanger, then flows through the heat exchanger, and is then discharged through the first outlet, or
    form a second flow path in which room air is drawn in through the second intake, then flows into the intake air inflow end of the total heat exchanger, then flows through the total heat exchanger, then flows through the heat exchanger, and is then discharged through the first outlet,
   to thereby form a flow path in the ventilator,
   while air flows through the flow path formed in the ventilator, control the outdoor unit to operate to form frost on the heat exchanger, and
   control the outdoor unit to stop operating based on a preset frosting termination condition so that the frost melts to clean the heat exchanger.

2. The ventilation system of claim 1, wherein
 the plurality of dampers include:
  a first damper configured to open and close the first intake, and
  a second damper configured to open and close a connection flow path formed between the first intake and the second intake, and
 the processor is configured to
  control the first damper to open the first intake and the second damper to close the connection flow path, and operate the first air blower to form the first flow path, or
  control the first damper to close the first intake and the second damper to open the connection flow path, and operate the first air blower to form the second flow path.

3. The ventilation system of claim 1, wherein
 the ventilator includes:
  a temperature sensor configured to detect a temperature of the outside air flowing through the first flow path or detect a temperature of the room air flowing through the second flow path, and
  a humidity sensor configured to detect a relative humidity of the outside air flowing through the first flow path or detect a relative humidity of the room air flowing through the second flow path.

4. The ventilation system of claim 3, wherein
 the processor is configured to:
  control the plurality of dampers to alternately form the first flow path and the second flow path for a preset period of time each, in response to entering the heat exchanger cleaning mode,
  calculate a first absolute humidity based on the detected temperature and the detected relative humidity of the outside air flowing through the first flow path, calculate a second absolute humidity based on the detected temperature and the detected relative humidity of the room air flowing through the second flow path, and select one of the first flow path and the second flow path to form the flow path in the ventilator based on a comparison between the first absolute humidity and the second absolute humidity.

5. The ventilation system of claim 4, wherein the processor is configured to:

select the first flow path based on the first absolute humidity being equal to or higher than the second absolute humidity, or select the second flow path based on the first absolute humidity being lower than the second absolute humidity.

6. The ventilation system of claim 3, wherein the ventilator includes:

a heat exchanger temperature sensor configured to detect a temperature of the heat exchanger, and the preset frosting termination condition includes an operation time of the outdoor unit reaching a preset limit time or the temperature of the heat exchanger reaching a target temperature.

7. The ventilation system of claim 6, wherein the processor is configured to determine the target temperature based on a preset correlation function having variables of the detected temperature and the detected relative humidity of the outside air flowing through the first path or having variables of the detected temperature and the detected relative humidity of the room air flowing through the second flow path.

8. The ventilation system of claim 3, wherein the processor is configured to determine a rotation speed of a compressor included in the outdoor unit and a rotation speed of the first air blower based on the detected relative humidity of the outside air flowing through the first flow path through or the detected relative humidity of the room air flowing through the second flow path.

9. The ventilation system of claim 8, wherein the processor is configured to:

reduce the rotation speed of the compressor and the rotation speed of the first air blower based on the detected relative humidity of the outside air flowing through the first flow path or the detected relative humidity of the room air flowing through the second flow path being higher than a preset reference humidity range, or increase the rotation speed of the compressor and the rotation speed of the first air blower based on the detected relative humidity of the outside air flowing through the first flow path or the detected relative humidity of the room air flowing through the second flow path being lower than the preset reference humidity range.

10. The ventilation system of claim 1, further comprising:
a display configured to display information regarding an operation of the ventilation system,
wherein the processor is configured to:

control the display to display flow path information regarding a selection of one of the first flow path and the second flow path.

11. The ventilation system of claim 1, further comprising:
a display configured to display information regarding an operation of the ventilation system,
wherein the processor is configured to:

control the display to display an expected time required until cleaning of the heat exchanger is completed after the outdoor unit is stopped based on the preset frosting termination condition.

12. A ventilation system comprising:
a ventilator; and
an outdoor unit,
wherein the ventilator includes:
a housing including a first intake, a second intake, a first outlet, and a second outlet,
a plurality of dampers configured to change flow paths of air flowing through the housing,
a first air blower configured to blow the air to the first outlet,
a second air blower configured to blow the air to the second outlet,
a total heat exchanger in the housing,
a heat exchanger in the housing,
a heat exchanger temperature sensor configured to detect temperature of the heat exchanger, and
a processor configured to, in response to entering a heat exchanger cleaning mode:
control the plurality of dampers, the first air blower, and the second air blower to force the air to flow into the heat exchanger,
while the air flows into the heat exchanger, control the outdoor unit to operate to form frost on the heat exchanger, and
control the outdoor unit to stop operating based on an operation time of the outdoor unit reaching a preset limit time or a detected temperature of the heat exchanger reaching a target temperature,
wherein the air forced to flow into the heat exchanger is selected from one of:
a first flow path in which outside air is drawn in through the first intake, then flows through an intake air inflow end of the total heat exchanger, then flows through the total heat exchanger, then flows through the heat exchanger, and is then discharged through the first outlet, and
a second flow path in which room air is drawn in through the second intake, then flows into the intake air inflow end of the total heat exchanger, then flows through the total heat exchanger, then flows through the heat exchanger, and is then discharged through the first outlet.

13. The ventilation system of claim 12, wherein the ventilator includes:
a temperature sensor configured to detect temperature of the air flowing into the heat exchanger, and
a humidity sensor configured to detect a relative humidity of the air flowing into the heat exchanger, and
the processor is configured to determine the target temperature based on a preset correlation function having the temperature of the air flowing into the heat exchanger and the relative humidity of the air flowing into the heat exchanger as variables.

14. The ventilation system of claim 12, wherein the ventilator includes:
a humidity sensor configured to detect a relative humidity of the air flowing into the heat exchanger, and
the processor is configured to determine a rotation speed of a compressor included in the outdoor unit and a rotation speed of the first air blower based on the detected relative humidity of the air flowing into the heat exchanger.

15. The ventilation system of claim 14, wherein the processor is configured to:
- reduce the rotation speed of the compressor and the rotation speed of the first air blower based on the relative humidity of the air flowing into the heat exchanger being higher than a preset reference humidity range, or
- increase the rotation speed of the compressor and the rotation speed of the first air blower based on the relative humidity of the air flowing into the heat exchanger being lower than the preset reference humidity range.

* * * * *